US010306218B2

(12) United States Patent
Shroff et al.

(10) Patent No.: US 10,306,218 B2
(45) Date of Patent: May 28, 2019

(54) CAMERA CALIBRATION APPARATUS AND METHODS

(71) Applicant: LIGHT LABS INC., Redwood City, CA (US)

(72) Inventors: Nitesh Shroff, Palo Alto, CA (US);
Weiguang Si, Fremont, CA (US);
Nagilla Dikpal Reddy, Palo Alto, CA (US); John Sasinowski, San Jose, CA (US); Nghi Phan, San Jose, CA (US);
Jiamin Bai, Menlo Park, CA (US);
Harpuneet Singh, Dublin, CA (US);
Rajiv Laroia, Far Hills, NJ (US)

(73) Assignee: LIGHT LABS INC., Redwood City, CA (US)

( * ) Notice: Subject to any disclaimer, the term of this patent is extended or adjusted under 35 U.S.C. 154(b) by 0 days.

(21) Appl. No.: 15/192,300

(22) Filed: Jun. 24, 2016

(65) Prior Publication Data

US 2017/0280135 A1  Sep. 28, 2017

Related U.S. Application Data

(60) Provisional application No. 62/311,837, filed on Mar. 22, 2016.

(51) Int. Cl.
*H04N 17/00* (2006.01)
*G06T 7/80* (2017.01)

(52) U.S. Cl.
CPC ............. *H04N 17/002* (2013.01); *G06T 7/80* (2017.01)

(58) Field of Classification Search
CPC ........................... H04N 17/002; H04N 5/2257
(Continued)

(56) References Cited

U.S. PATENT DOCUMENTS

| 4,890,133 A | 12/1989 | Ogawa et al. |
| 5,078,479 A | 1/1992 | Vuilleumier |

(Continued)

FOREIGN PATENT DOCUMENTS

| EP | 2642757 A2 | 9/2013 |
| JP | 10091765 | 4/1998 |

(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

(Continued)

*Primary Examiner* — Brian P Yenke
*Assistant Examiner* — Sean N. Haiem
(74) *Attorney, Agent, or Firm* — Straub & Straub; Michael P. Straub; Stephen T. Straub

(57) ABSTRACT

An exemplary camera calibration apparatus includes a movable, e.g., rotatable, support structure which is controllably positioned to allow for image capture of different test patterns and image capture of the same pattern at different distances by a mounted camera. A first test pattern is mounted on a wall, e.g., a pyramid shaped 4 sided wall formed by panels surrounding the camera under calibration. The movable support structure has a first mirror attached to a first side and has a second test pattern attached to a second side. A second mirror mounted on an internal sidewall of the calibration apparatus housing facilities a different image path distance between the camera capturing the image of the first test pattern and the first test pattern. The exemplary camera calibration apparatus is well suited for efficiently calibrating camera devices including a plurality of camera modules, e.g., optical chains, in a relatively small area.

14 Claims, 25 Drawing Sheets

(58) Field of Classification Search
USPC .............. 348/188, 187, 51; 359/877; 606/4; 356/124
See application file for complete search history.

(56) References Cited

U.S. PATENT DOCUMENTS

| | | | |
|---|---|---|---|
| 5,153,569 A | 10/1992 | Kawamuraa et al. |
| 5,353,068 A | 10/1994 | Moriwake |
| 5,583,602 A | 12/1996 | Yamamoto |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,011,661 A | 1/2000 | Weng |
| 6,028,600 A | 2/2000 | Rosin et al. |
| 6,081,670 A | 6/2000 | Madsen et al. |
| 6,141,034 A | 10/2000 | McCutchen |
| H2114 H * | 2/2005 | Novak .............. G01N 21/95607 356/124 |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,801,428 B2 | 9/2010 | Nagaishi et al. |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 | 4/2013 | Tardif |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B2 | 12/2013 | Cuirea et al. |
| 8,639,296 B2 | 1/2014 | Ahn et al. |
| 8,665,341 B2 | 3/2014 | Georgiev et al. |
| 8,704,944 B1 | 4/2014 | Wierzoch et al. |
| 8,762,895 B2 | 6/2014 | Metha et al. |
| 8,780,258 B2 | 7/2014 | Lee |
| 8,896,655 B2 | 11/2014 | Mauchly et al. |
| 9,041,826 B2 | 5/2015 | Jung et al. |
| 9,104,705 B2 | 8/2015 | Fujinaga |
| 9,135,732 B2 | 9/2015 | Winn et al. |
| 9,282,228 B2 | 3/2016 | Laroia |
| 9,374,514 B2 | 6/2016 | Laroia |
| 2002/0149691 A1 | 10/2002 | Pereira et al. |
| 2003/0018427 A1 | 1/2003 | Yakota et al. |
| 2003/0020814 A1 | 1/2003 | Ono |
| 2003/0185551 A1 | 10/2003 | Chen |
| 2004/0100479 A1 | 5/2004 | Nakano et al. |
| 2004/0227839 A1 | 11/2004 | Stavely et al. |
| 2005/0041313 A1* | 2/2005 | Stam .................. G02B 27/1013 359/877 |
| 2005/0088546 A1 | 4/2005 | Wang |
| 2005/0200012 A1 | 9/2005 | Kinsman |
| 2005/0225640 A1* | 10/2005 | Sadano ................ H04N 17/002 348/187 |
| 2006/0067672 A1 | 3/2006 | Washisu et al. |
| 2006/0187338 A1 | 8/2006 | May et al. |
| 2006/0221218 A1 | 10/2006 | Alder et al. |
| 2006/0238886 A1 | 10/2006 | Kushida et al. |
| 2006/0281453 A1 | 12/2006 | Jaiswal et al. |
| 2007/0050139 A1 | 3/2007 | Sidman |
| 2007/0065012 A1 | 3/2007 | Yamakado et al. |
| 2007/0127915 A1 | 6/2007 | Lu et al. |
| 2007/0173792 A1* | 7/2007 | Arnoldussen ............ A61F 9/008 606/4 |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0240698 A1 | 10/2008 | Bartilson et al. |
| 2008/0247745 A1 | 10/2008 | Nilsson |
| 2008/0251697 A1 | 10/2008 | Park et al. |
| 2008/0278610 A1 | 11/2008 | Boettiger |
| 2008/0291322 A1* | 11/2008 | Schick ................ H04N 5/2253 348/374 |
| 2009/0086032 A1 | 4/2009 | Li |
| 2009/0136223 A1 | 5/2009 | Motomura et al. |
| 2009/0154821 A1 | 6/2009 | Sorek et al. |
| 2009/0225203 A1 | 9/2009 | Tanida et al. |
| 2009/0278950 A1 | 11/2009 | Deng et al. |
| 2009/0290042 A1 | 11/2009 | Shiohara |
| 2009/0323036 A1* | 12/2009 | Hidaka ................. G03F 9/7026 355/53 |
| 2010/0013906 A1 | 1/2010 | Border et al. |
| 2010/0034531 A1 | 2/2010 | Go |
| 2010/0045774 A1 | 2/2010 | Len et al. |
| 2010/0053414 A1 | 3/2010 | Tamaki et al. |
| 2010/0079635 A1 | 4/2010 | Yano et al. |
| 2010/0091089 A1 | 4/2010 | Cromwell et al. |
| 2010/0097443 A1 | 4/2010 | Lablans |
| 2010/0225755 A1 | 9/2010 | Tamaki et al. |
| 2010/0238327 A1 | 9/2010 | Griffith et al. |
| 2010/0265346 A1 | 10/2010 | Iizuka |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0033069 A1 | 2/2012 | Becker et al. |
| 2012/0062691 A1 | 3/2012 | Fowler et al. |
| 2012/0122252 A1* | 5/2012 | Fujimori .......... G01N 21/95692 438/16 |
| 2012/0155848 A1 | 6/2012 | Labowicz et al. |
| 2012/0162464 A1 | 6/2012 | Kim |
| 2012/0188391 A1 | 7/2012 | Smith |
| 2012/0027462 A1 | 8/2012 | Justice |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0182083 A1* | 7/2013 | Grossmann ........ H04N 13/0402 348/51 |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2013/0342677 A1* | 12/2013 | Park ....................... G01B 11/25 348/87 |
| 2014/0049677 A1 | 2/2014 | Kawaguchi |

(56) References Cited

U.S. PATENT DOCUMENTS

| | | |
|---|---|---|
| 2014/0063018 A1 | 3/2014 | Takeshita |
| 2014/0098229 A1* | 4/2014 | Lu .................. H04N 7/181 348/148 |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0232850 A1* | 8/2014 | Park ............. G01N 21/95684 348/92 |
| 2014/0267243 A1 | 9/2014 | Venkataraman et al. |
| 2014/0293079 A1 | 10/2014 | Milanfar et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0138372 A1* | 5/2015 | Apel ................... G02B 27/62 348/188 |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0253647 A1 | 9/2015 | Mercado |
| 2015/0279012 A1 | 10/2015 | Brown et al. |
| 2016/0142610 A1 | 5/2016 | Rivard et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

* cited by examiner

CAMERA CALIBRATION APPARATUS AND METHODS

RELATED APPLICATIONS

The present application claims the benefit of U.S. Provisional Patent Application Ser. No. 62/311,837 filed Mar. 22, 2016 which is hereby expressly incorporated by reference in its entirety.

FIELD

The present application relates to methods and apparatus that can be used in capturing images that can be used in calibrating a camera, e.g., a camera including multiple camera modules.

BACKGROUND

Calibration of camera devices often involves taking of images of one or more calibration targets at different distances from a camera device. The capture of multiple targets at different distances can be particularly important in the case of a camera device which includes multiple camera modules that capture different images from which depth or other image information may be obtained.

In order to capture depth information and/or support computational photography where multiple images may be combined to generate an output image, camera devices may, and sometimes do, include more than one camera module. In order to facilitate combining of images captured by different camera modules of a camera device, it often useful to know the spatial relationship of the cameras and the field of view which will be captured by each camera for one or more camera settings.

While a camera may be manufactured with the intent of a particular spatial relationship between the camera's modules, due to mounting issues, manufacturing tolerances and/or other reasons, the precise physical relationship between the camera's modules may not be known to the extent desired simply from the design specifications.

In the case where a camera includes numerous camera modules the complexity in achieving precise camera alignment between the many camera modules of a camera increases as the number of camera modules increases. For example, achieving a precise alignment between 6 camera modules is far more complicated from a manufacturing perspective than achieving alignment between two camera modules.

Given that there may be minor differences in the spatial relationship from one camera device to another camera device, particularly in the case where a camera device includes a large number of camera modules, calibration of the camera device can be important.

Camera device calibration may require the taking of images of one or more test patterns, e.g., with the test patterns being at different distances from the camera device to be calibrated. While it might be possible to take a camera device from one test rig to another test rig with the calibration targets being at different distances from the camera device in each test rig, such an approach to capturing the images for calibrating a camera can be time consuming. In addition, having multiple test rigs with targets at different distances can involve the use of a fair amount of floor space. Dedicating a large amount of floor space to calibration rigs can be costly, given that manufacturing and/or space is often rented on a square foot basis.

In view of the above discussion it should be appreciated that there is a need for improved calibration apparatus which would allow images of targets at different distances from a camera to be captured in a single apparatus, preferably without the need to move the camera device being calibrated between captures of images of calibration targets. While not essential, it would be desirable from a cost and manufacturing materials perspective if the calibration apparatus could be implemented in a relatively small form without requiring a large amount of floor space to store or use.

SUMMARY

In various embodiments, an apparatus includes a holder, e.g., camera mount, a movable mirror, and one or more test patterns. The movable mirror may be, and in some embodiments is, used in combination with a fixed mirror. By moving the movable mirror and/or a test pattern, different distances between a camera device and one or more test patterns can be supported.

In some embodiments during use, a camera device is placed in the holder, e.g., a fixed camera mount, and controlled to take multiple images, e.g., with a mirror and/or test pattern at different positions. By either directly capturing an image of a test pattern or capturing an image of a test pattern reflected in one or more mirrors, images corresponding to different distances from the camera can be supported in a relatively small space without having to change the position of the camera in the holder.

In one embodiment a test pattern, e.g., a second test pattern, e.g., a test grid, is mounted on a second side, e.g., rear side, of a movable support structure, e.g., frame or other rigid support such as a board or plate. In some embodiments a mirror is mounted on a first side, e.g., front side, of the movable support structure. A first test pattern in at least some such embodiments is placed around the camera holder. The first test pattern may include four flat test patterns, each mounted on a different sloped surface surrounding the camera holder.

The movable support may be secured to a motor capable of moving, e.g., rotating, the moveable support to orient the second test pattern and first mirror in a variety of positions. During use in one embodiment the second test pattern is rotated to face the camera to be tested, e.g., the movable support is oriented to a second position. The camera device is controlled to capture images of the second test pattern while the second test pattern is facing the camera device.

Rotation of the support structure from the second position to a first position is used so that the first mirror mounted on the support structure will directly face the camera device. This results in the first test pattern surrounding the camera device being presented in the first mirror to the camera device. The distance between the surface of the first test pattern and the camera device will be approximately twice the distance from the camera device to the second test pattern since the light from the first test pattern will first travel to the first mirror and then be reflected back before reaching the first camera. Thus by using the first mirror two different distances can be supported in a relatively small space.

To further increase the perceived distance between the camera and the first test pattern, an additional mirror, e.g., a second mirror can be used in combination with the first mirror. The second mirror may be, and sometimes is, fixed to a sidewall of the calibration apparatus. To take advantage of the second mirror, the support structure is rotated to a third position which causes the image of the first test pattern to be reflected into the second mirror and then back from the second mirror to the first mirror which then directs the reflected light into the camera. By operating the camera device to use its modules to capture the image of the first test pattern reflected by both the first movable mirror and the second fixed mirror a third distance to a test pattern can be supported.

In some embodiments the support structure, on which the first mirror and second test pattern are mounted, is supported on a rotatable shaft from the top or roof of the test apparatus. The shaft may be a motor shaft of a controllable motor, which can be controlled to drive, e.g., rotate, the support structure between the first, second and third positions or any number of desired positions. In some embodiments a circular guide or track is used to stabilize the outer edge of the support structure, e.g., board or movable wall, to support at least some of the weight of the support structure and mirror mounted thereon. In some embodiments, the support structure is a hanging door or wall with a mirror mounted on one side and a test pattern on the other side. The circular guide may be a track in which wheels secured to the support structure are hung and ride. The wheels within the track move as the moveable support structure is rotated. In some embodiments the apparatus of the present invention is designed to be used with two cameras at the same time. In one such embodiment, first and second camera holders are placed on opposite sides of the test apparatus with the rotatable support in between the two camera holders. The first camera holder is surrounded by the first test pattern which is mounted on sloped sidewalls, while the second camera holder is surrounded by a third test pattern which is mounted on sloped sidewalls surrounding the second camera holder. In one such embodiment the first mirror is mounted on one side of the rotatable support while the second test pattern is mounted on the other side of the rotatable support. Second and third fixed mirrors are mounted on opposing interior sidewalls of the test apparatus. While the first movable mirror is facing the first holder the modules in the first camera are controlled to capture images of the first test pattern reflected in the first mirror. The support structure on which the first mirror and second test pattern are mounted is rotated into another position in which the first mirror faces the second camera holder and the second test pattern faces the first camera holder. While in this position the first camera in the first holder is operated to take images of the second test pattern while a second camera in the second holder is operated to take images of the third test pattern reflected in the first mirror. The support structure can be rotated so that at third and fourth positions, respectively, the second and third side mirrors can be used to reflect the first and third test patterns, e.g., targets, in the first mirror allowing the first and second cameras to capture images at a depth, e.g., distance, which takes into consideration the multiple reflections.

As an alternative to rotating the support structure around a central point as shown in some embodiments, in other embodiments the mirror and/or second test pattern, e.g., second target, are mounted on hinges or tracks and moved into place using a swinging motion or another motion such as sliding the mirror or guide into place by sliding it along a track or tracks. In such embodiments the first mirror and second test pattern may not be mounted on opposite sides of a single support structure but may be mounted on the same sides of a support structure or on different support structures that may be slid or swung into places as needed.

Lights may be positioned as strips in a variety of locations within the test apparatus to illuminate the various test patterns included in the test apparatus. For example, strips of lights may be placed around and in front of the first test pattern, e.g., first target, and around the second test pattern, e.g., second target, and/or first mirror. Other locations are also possible.

Control circuitry and/or the drive motor, used to rotate or move the support structure on which the first mirror and/or second test pattern, e.g., second target, are mounted, can be, and in some embodiments is, mounted in, on or above a roof of the test apparatus, thus avoiding having to use additional floor space for such components as might be the case if such components were mounted on the side of the test apparatus.

Depending on the embodiment the test apparatus allows one or more cameras to remain fixed in a holder and to capture images corresponding to different depths in a short amount of time and without requiring a lot of floor space for the test apparatus.

In some but not all embodiments a test pattern which is intended to allow of use of lights which may have a non-uniform or slightly non-uniform light output are used. In one such embodiment patches or strips of a uniform color area, e.g., a white area, are positioned adjacent color test areas, e.g., color patches. My detecting the illumination on the uniform color area, e.g., white color area, the effect of the non-uniform illumination can be taken into consideration when measuring and using the amount of light detected on the adjacent color patch being used for color calibration. Thus the uniform white area also for non-uniform illumination to be detected and a normalization or other compensation process being taking advantage of the illumination information when performing color calibration based on an adjacent color patch which is illuminated by the same noon-uniform light source.

An exemplary camera calibration apparatus, in accordance with some embodiments, includes: a first camera holder; a first test pattern; and a first mirror for reflecting an image of the first test pattern to a camera in said first camera holder when said first mirror is in a first position facing said first camera holder. An exemplary method of operating a camera test apparatus, in accordance with some embodiments, includes: controlling one or more modules in a camera to capture an image of a first test pattern when a movable support on which a first mirror is in a mounted is in a first position, said first mirror facing the camera when the movable support is in the first position; moving the movable support to a second position so that a second test pattern mounted on the movable support is facing the camera; and controlling the one or more modules in the camera to capture an image of the second test pattern when the movable support is in the second position.

While many embodiments and features have been discussed in the above summary, it should be appreciated that many of the novel features described herein can be used independent of other novel features. Thus, while various exemplary embodiments have been described, the application is not limited to the particular exemplary embodiments or combinations of features described in particular exemplary embodiments.

Numerous variations and benefits of the above described methods and apparatus will be apparent in view of the detailed description which follows.

DETAILED DESCRIPTION

Figure 1:
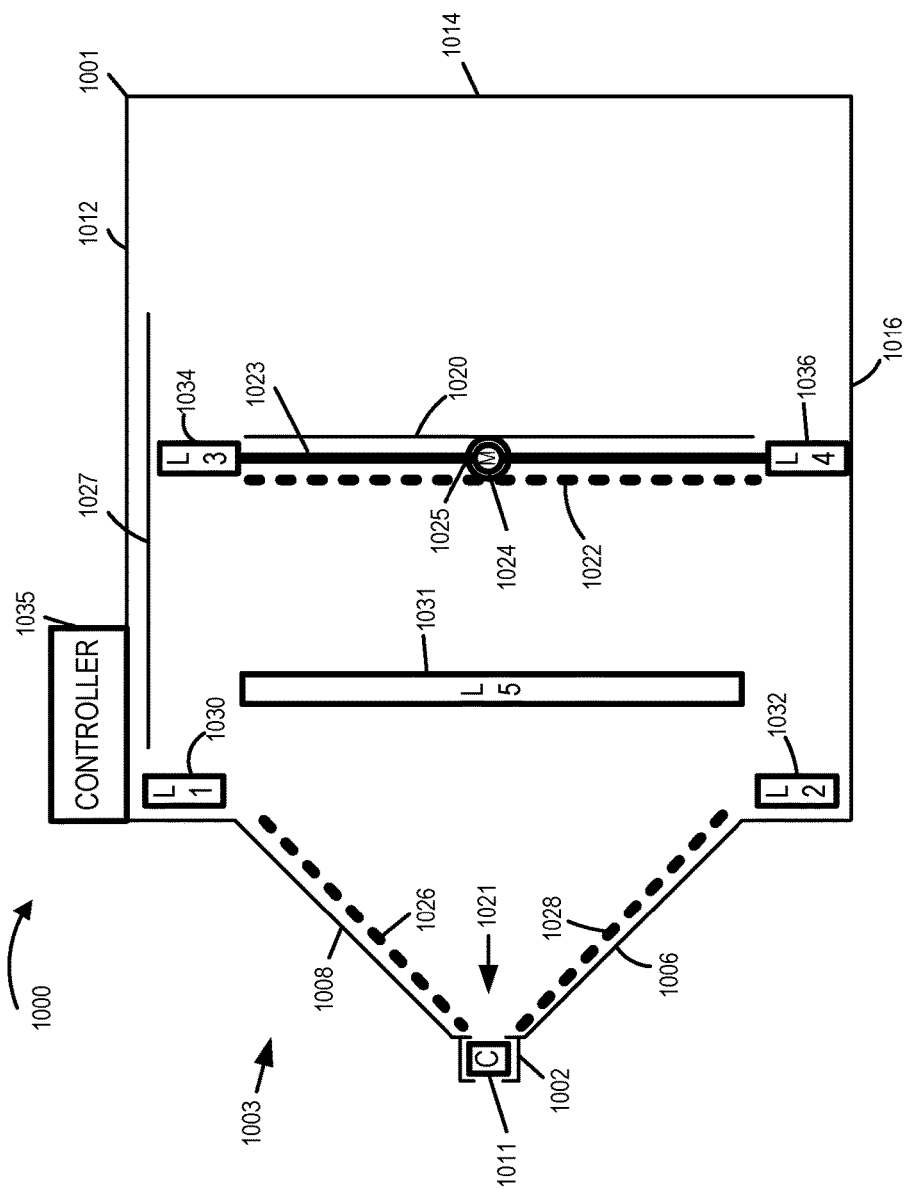
FIG. 1 is a top view of an exemplary test apparatus including a camera holder in which a camera to be tested is mounted and including a movable support structure in a second position in which a second test pattern, e.g., second target, mounted on a support structure is facing the camera holder and first mirror mounted on the other side of the support structure is facing away from the camera holder.

FIG. 1 is a top view of an exemplary test apparatus 1000, e.g., a camera calibration apparatus, including a camera holder 1002 in which a camera 1011 is shown mounted. The test apparatus 1000 includes a four sided housing 1001 which includes a front sidewall 1003, a left sidewall 1012, a rear wall 1014 and a right sidewall 1016. The housing 1001 further includes a bottom and a ceiling or roof section but the roof section is not shown so that the inside components of the test apparatus 1000 can be viewed in FIG. 1.

Figure 17:
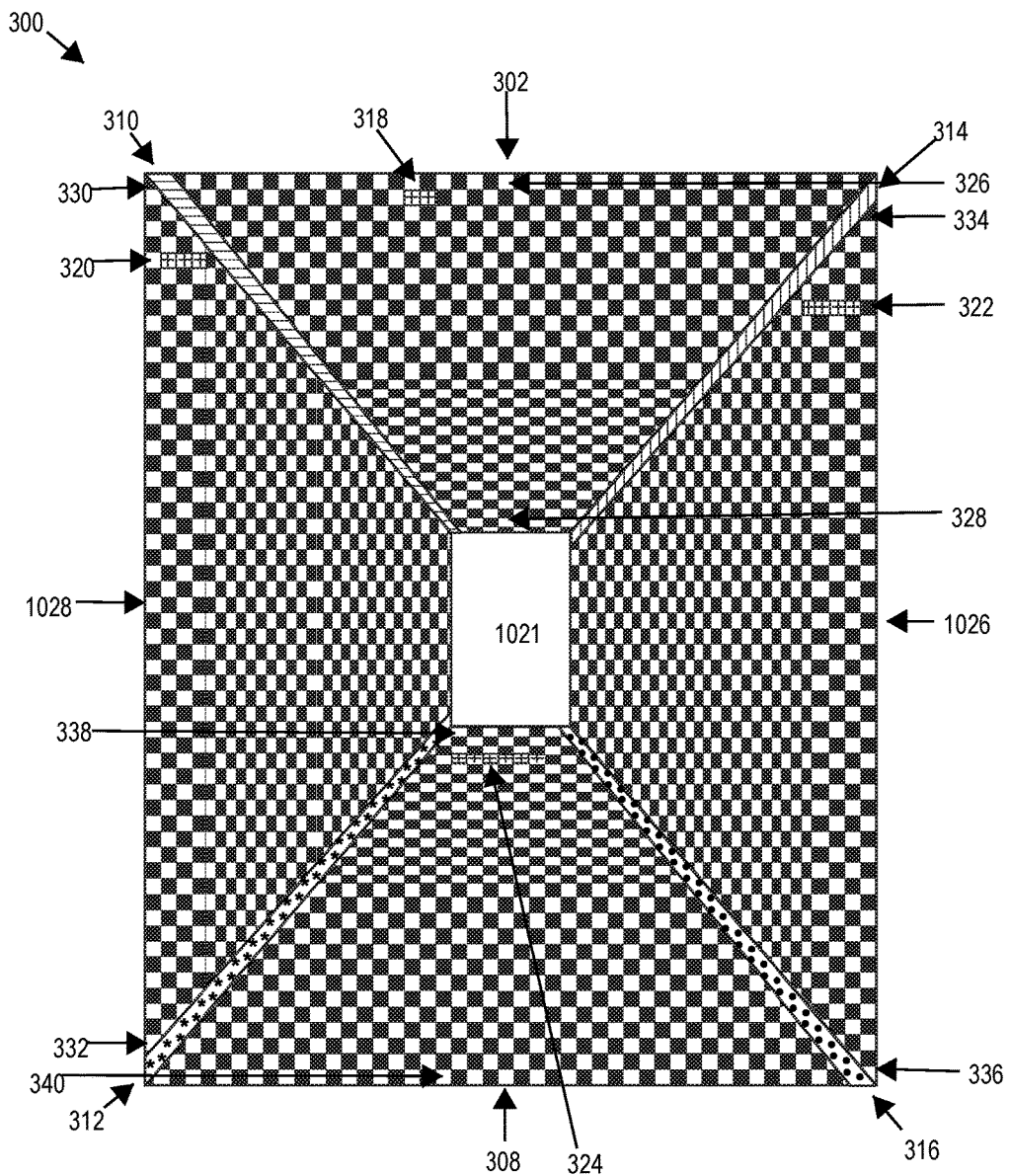
FIG. 17 is a drawing of an exemplary test pattern, e.g., a first test pattern including multiple first test pattern portions, which may be included in an exemplary camera calibration apparatus in accordance with an exemplary embodiment.

The front sidewall 1003 includes tapered sides 1008, 1006, e.g., panels, and also a tapered top and bottom portion which are not visible in FIG. 1 which form a four sided cone shape tapered structure which extends from a large opening in the sidewall 1003 towards a first camera mount 1002. A first camera 1011 is shown inserted into the camera holder 1002. The camera modules of the camera 1011 have a view of the interior of the test apparatus 1000 via viewing opening or viewing window 1021. Along the inside surface of the tapered sidewall portions 1008, 1006 and the upper and lower tapered portions of the front sidewall 1003, a first test pattern, e.g., test pattern 300 of FIG. 17, is mounted. The first test pattern in some embodiments includes four portions, one per tapered sidewall portion. The four sided tapered test pattern forms a 3 dimensional test pattern having a known shape and test pattern which can be used for calibrating the camera 1011 so that accurate depth measurements can be made from the images captured by the different modules of the camera 1011.

The first test pattern surrounds the camera holder 1002 and viewing port 1021 and includes pattern portions 1026, 1028 as well as top and bottom pattern portions. Each of the four distinct portions may, and sometimes do, include a different color line allowing for easy identification of each one of the four individual portions in captured images. The four distinct portions may also include orientation indicators, e.g., a pattern indicating the top portion and/or bottom of each test portion panel and/or a visual code which allows for identification of the portion and orientation of the portion. Thus, from captured images each of the portions, including portions 1026, 1028, of the first test pattern, which side of the pattern is being viewed and the orientation of the camera capturing the images can be readily determined.

The first test pattern including first test pattern portions 1026, 1028 surrounds the camera holder 1002 but is not directly visible from the camera holder 1002. Rather, the viewing port 1021 faces the center portion of the test apparatus 1000 where a movable support structure 1023 is suspended from the ceiling of the test apparatus 1000, e.g., on a shaft 1025 of a motor 1024. The support structure 1023 may be a metal frame or ridged board on which a test target, e.g., second test pattern 1022, and/or mirror, e.g., first mirror 1020, may be, and sometimes are, mounted. The motor 1024 can be used to rotate the support structure 1023 to a variety of positions.

In the FIG. 1 embodiment a second test pattern 1022, e.g., a flat grid pattern, is mounted on a second side of the support structure 1023 and a first mirror 1020 is mounted on a first side of the support structure 1023. When the support structure 1023 is in the second position shown in FIG. 1, the second test pattern 1022, e.g., second target, faces the camera holder 1002 and images of the second test pattern, e.g., second target, can be captured by the modules of the camera 1011 mounted in the camera holder 1002. In addition to the first mirror 1020 mounted on the moveable support apparatus 1023, the test apparatus 1000 includes a second mirror 1027 mounted on the first sidewall 1012. In the FIG. 1 embodiment the second sidewall 1016 does not have a mirror mounted thereon but as will be discussed below in other embodiments a mirror may be, and sometimes is, mounted on the second sidewall 1016. The use of the first and second mirrors 1020, 1027 to support different distances for captured images of a target, e.g., a first test pattern including first test pattern portions 1026, 1028, will be discussed further below with reference to one or more of the other figures.

It should be appreciated that the test apparatus 1000 is shown as being generally square but other shapes are possible. In order to facilities image capture and block interference from exterior light sources, the top, bottom, left side 1012, right side 1016, front 1003, and rear 1014 of the test apparatus 1000 are normally solid blocking the passage of stray light into the interior of the test apparatus 1000. Controlled illumination of the test targets, e.g., first and second test patterns, is provided by one or more arrays, e.g., strips of lights, e.g., LEDs, which are illuminated in a controlled manner depending on which test pattern, e.g., target, is being used at a given time. Exemplary lighting elements L1 1030, L2 1032 are provided along the sides of the first test pattern including first test pattern portions 1026, 1028 and also may be provided above and below the first test pattern in the plane to which the first and second light strips 1030, 1032 correspond. Lights L1 1030 and L2 1032 may be, and sometimes are illuminated when an image of the second test pattern 1022 is being taken. An additional light strip or array of light strips L5 1031 may be included and may face either the second test pattern 1022 or first test pattern including test pattern portions 1026, 1028. Depending on the orientation of light strip L5 1031, when present, it will be activated when capturing an image of the test pattern on which it directs light.

Light strips L3 1034, L4 1036 may be mounted on the movable support structure 1023 facing outward from the side of the support structure on which the first mirror 1020 is mounted so that when the first mirror 1020 faces the first test pattern target formed by first test pattern portions including portions 1026, 1028 the first test pattern, e.g. first target, will be illuminated. Alternatively light strips L3 1034, L4 1036 may be, and sometimes are, placed at fixed locations along the top and bottom of the test apparatus 1000 facing the first test pattern including first test pattern portions 1026, 1028 but not directly into the modules of the camera 1011 and are illuminated when an image of the first test pattern is to be captured.

Light strips can be placed in a wide variety of locations in the test apparatus 1000 and used to illuminate the first or second test patterns, e.g., first or second targets, at a given point in time depending on which target is to be captured during a given time interval.

The test apparatus 1000 further includes a controller 1035 that is used to control motor 1024 position, target illumination and image capture by the camera 1011 mounted in the holder 1002 so that multiple images of the first and second test patterns, e.g., first and second targets, are captured, e.g., with the movable support 1023 at each of a plurality of different predetermined positions. While shown on the left side of the apparatus 1000, the controller 1035 is mounted in, on or above, the ceiling of test apparatus 1000 in some embodiments to avoid using floor space and is shown outside the sidewall 1012 simply so that it can be seen in the FIG. 1 drawing. The controller 1035 is coupled to the camera 1011, motor 1024 and illumination elements 1030, 1032, 1031, 1034 and 1036 and configured to control the capture of images and movement of the movable support according to one or more predetermined test sequences and/or under control of a human operator.

The positioning of the camera 1011 to be tested so that it faces into the test apparatus 1000 allows the camera 1011 to capture images of the interior of the test apparatus 1000, e.g., images of the test patterns, and which pattern, e.g., second test pattern 1022 or first test pattern including first test pattern portions 1026, 1028, is captured at a given time depends on the position of the moveable support 1023. The camera 1001 could be a single module camera but in various embodiments the camera 1001 includes multiple camera modules, e.g., multiple optical chains each optical chain including a lens and sensor, each of which is capable of capturing an image. The approximate alignment of the optical chains may be generally known, e.g., based on intended design specifications, but due to manufacturing differences and/or for other reasons the actual achieved alignment between the multiple optical chains may be expected to vary from the intended design alignment and/or from one camera to another camera. It may be useful to determine the relative alignment of the camera, e.g., it may be desirable to determine actual alignment between the multiple optical chains of each manufactured camera device.

To facilitate camera calibration and determination of the alignment of the camera modules, images of test patterns may be taken and compared to determine actual camera module alignment and/or offset parameters indicating an offset from a desired or intended camera module alignment. The offset information can be, and sometimes is, stored in the camera for future use in combining image and or to be provided to a processing system which may process the images captured by the camera 1011. To facilitate the capture of different test patterns at different distances, the test apparatus 1001 includes a first test pattern which is mounted on front sidewall 1003, said first test pattern including first test pattern portions 1026, 1028 mounted on front sidewall portions 1008, 1006, respectively, and a second test pattern 1022 which is mounted on moveable support structure 1023.

In the FIG. 1 example the moveable support structure 1023 is in a second position in which the second test pattern 1022 faces the camera holder 1002 and is directly observable by the camera 1011 mounted in the first camera holder 1002.

Figure 2:
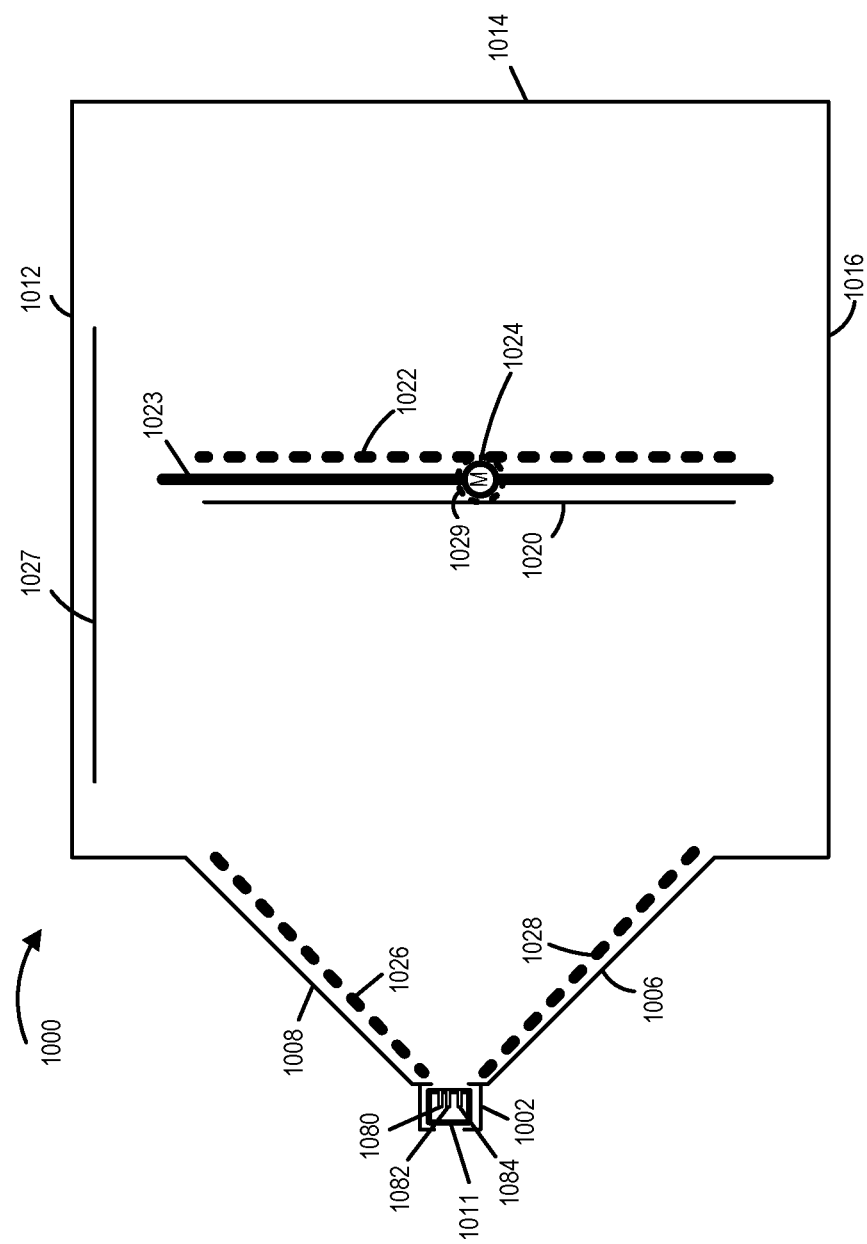
FIG. 2 is a simplified top view of the exemplary test apparatus of FIG. 1 with the support structure moved, e.g., rotated, to a first position in which the first mirror is facing the camera holder allowing an image of a first test pattern, e.g., a first target, surrounding the camera holder to be seen in the first mirror.

FIG. 2 is a simplified top view of the exemplary test apparatus 1000 of FIG. 1 with the movable support structure 1023 moved, e.g., rotated, to a first position in which the first mirror 1020 is facing the camera holder 1002 allowing an image of a target, e.g., first test pattern including test pattern portions 1026, 1028 surrounding the camera holder 1002 to be seen in the first mirror 1020. FIG. 2 and various other figures omit the lighting elements 1030, 1032, 1034, 1036, 1031 and controller 1035 shown in FIG. 1 to facilitate an appreciation of the placement and orientation of the elements shown in these additional figures. FIG. 2 illustrates that exemplary camera 1001 includes a plurality of camera modules, e.g., optical chains (camera module 1 1080, camera module 2 1082, . . . , camera module N 1084). In various embodiments, each camera module, e.g., optical chain, includes at least one lens and an image sensor. In some embodiments, at least some of the camera modules, e.g., optical chains, in camera 1001 include a light redirection element, e.g., a mirror. In some embodiments, at least some of the camera modules, e.g., optical chains, in camera 1001 include a moveable lens barrel. FIG. 2 further illustrates a position sensing device 1029, e.g., a syncho, resolver, optical position sensor, etc., included in some embodiments, which senses the position of the movable support structure 1023.

Figure 3:
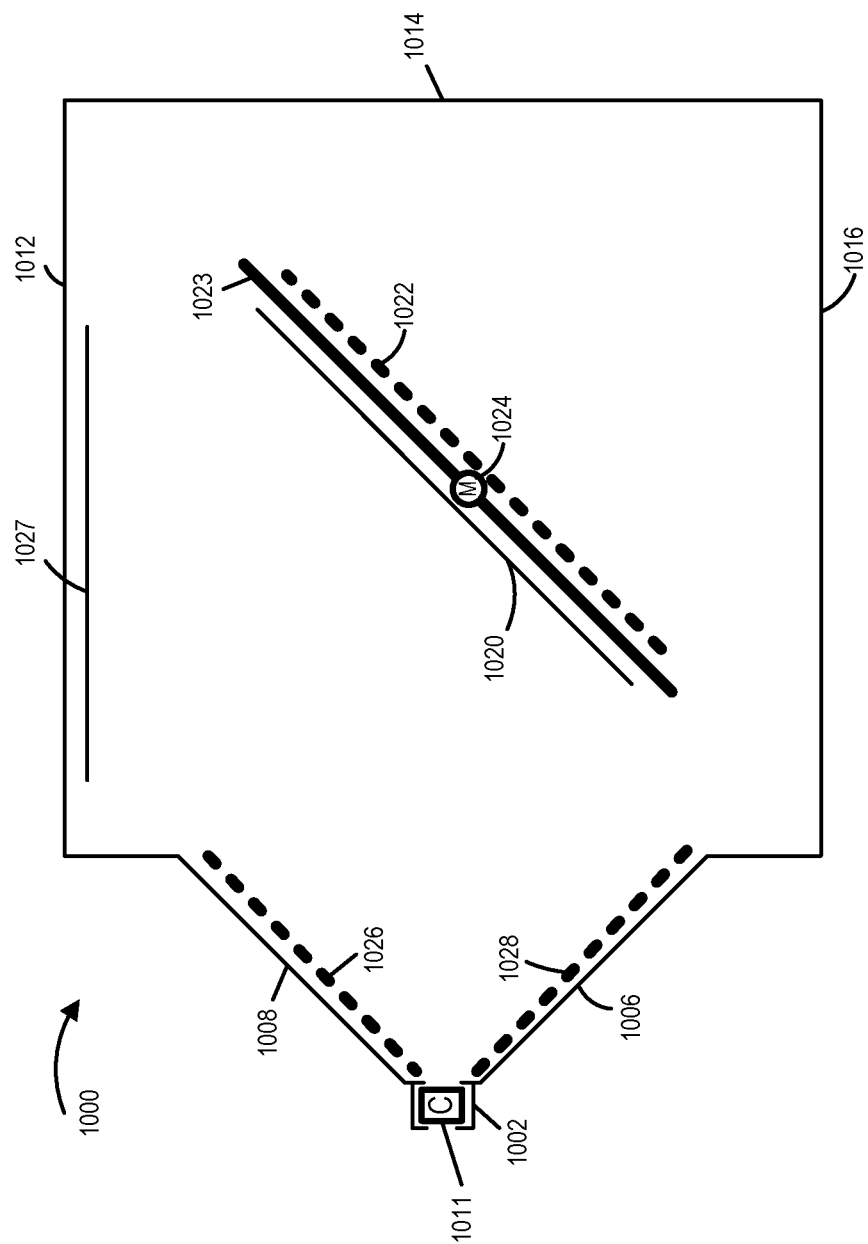
FIG. 3 is a simplified top view of the exemplary test apparatus of FIG. 1 with the support structure moved, e.g., rotated, to a third position in which the first mirror is at an angle relative to the camera holder allowing an image of the first test pattern, e.g., first target, surrounding the camera holder to be reflected in the first mirror towards a second mirror on the side wall of the test apparatus and then back towards the first mirror and then back towards the camera holder.

FIG. 3 is a simplified top view of the exemplary test apparatus 1000 of FIG. 1 with the movable support structure 1023 moved, e.g., rotated, to a third position in which the first mirror 1020 is at an angle relative to the camera holder 1002 allowing an image of the target, e.g., first test pattern including first test pattern portions 1026, 1028, surrounding the camera holder 1002 to be reflected in the first mirror 1020 towards a second mirror 1027 on the side wall 1032 of the test apparatus 1000 and then back towards the first mirror 1020 and then back toward the camera holder 1002.

Figure 4:
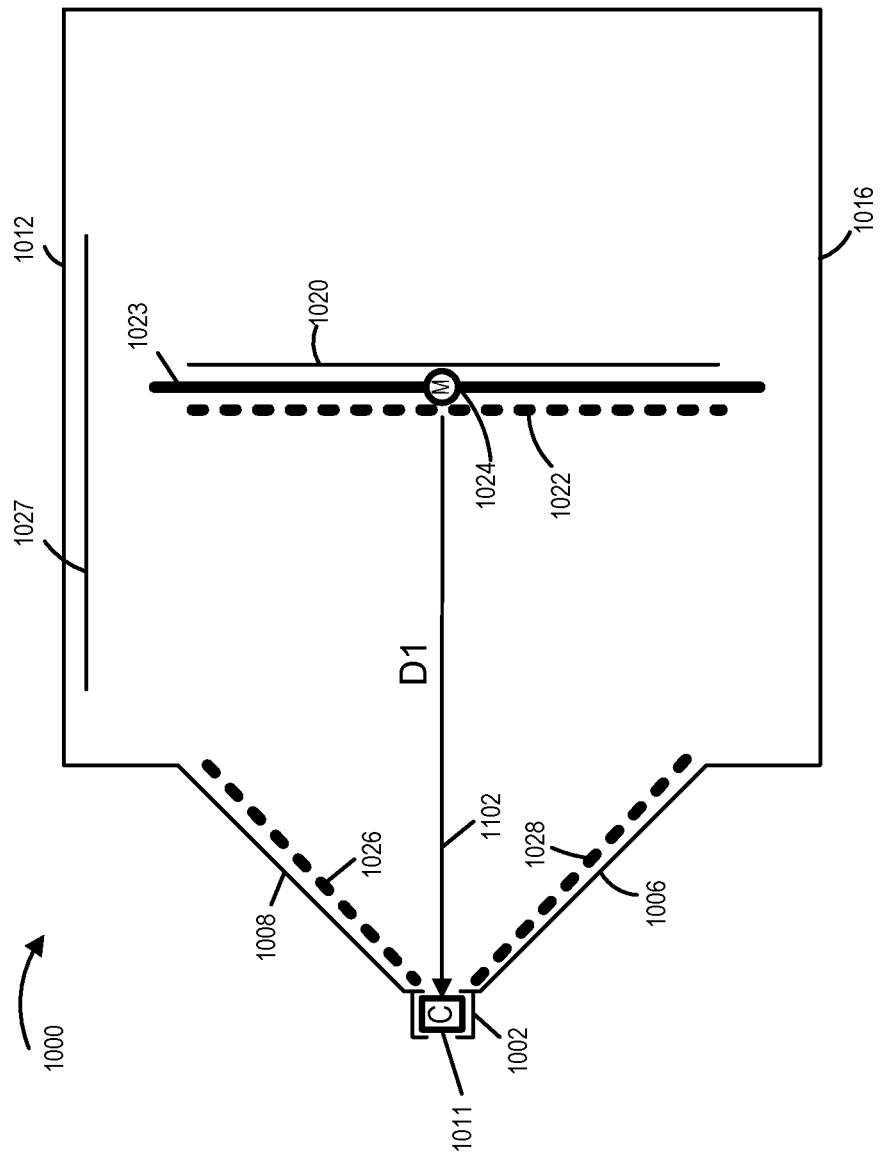
FIG. 4 shows how light from a target, e.g. a second test pattern, may travel before reaching the camera at a given time during which the moveable support structure is at a second position.
Figure 5:
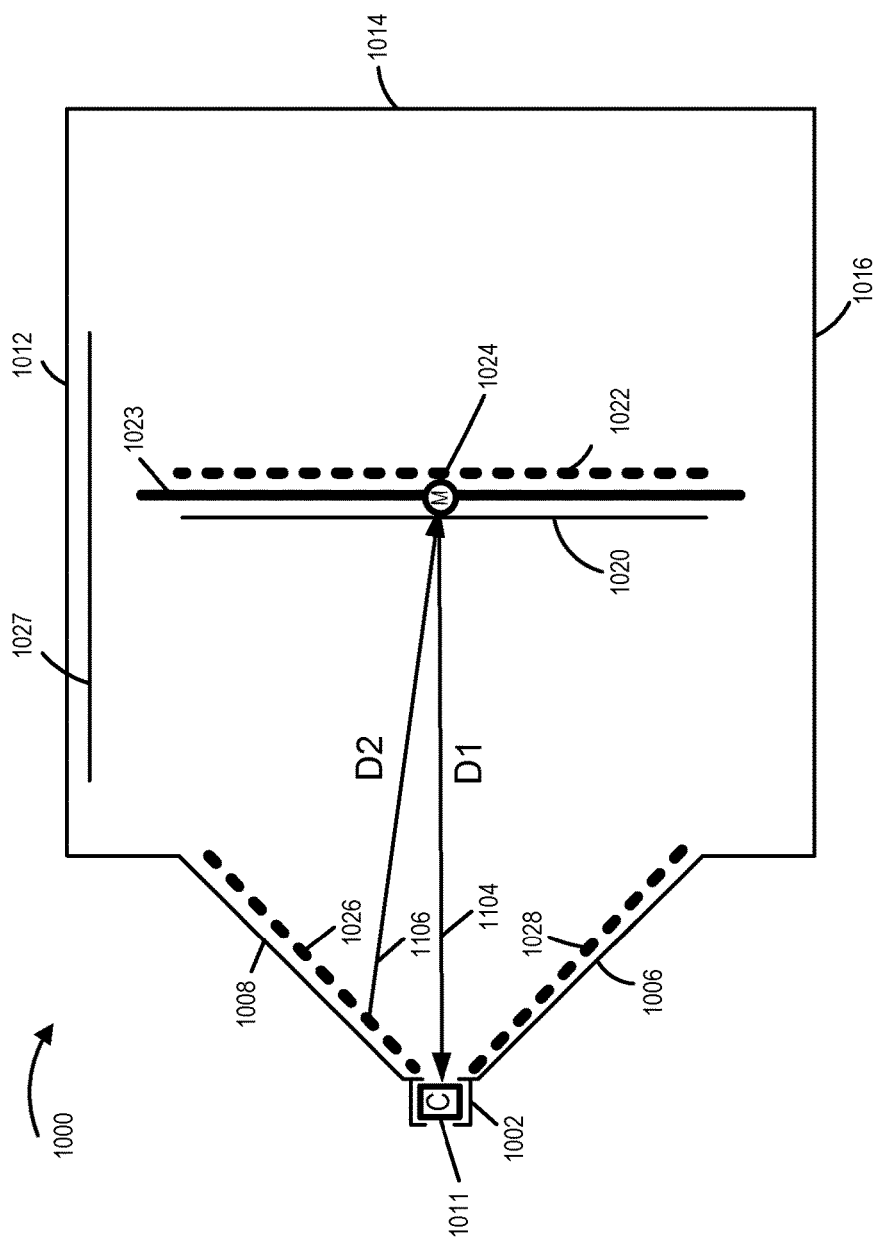
FIG. 5 shows how light from a target, e.g., a first test pattern, may travel before reaching the camera at a given time during which the moveable support structure is at a first position.
Figure 6:
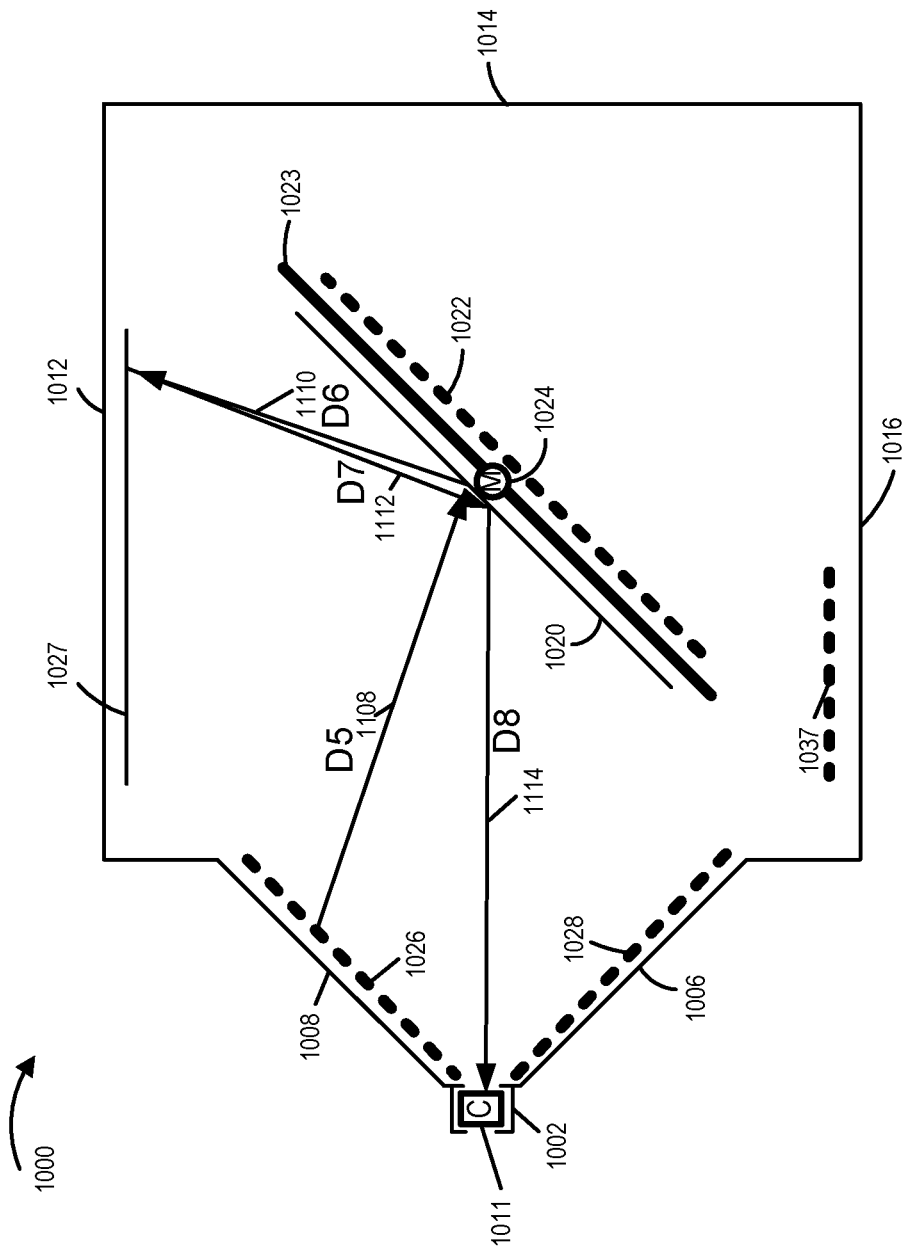
FIG. 6 shows how light from a target, e.g., a first test pattern, may travel before reaching the camera at a given time during which the moveable support structure is at a third position.

FIGS. 4, 5 and 6 show how light from a target, e.g., a test pattern, may travel before reaching the camera 1011 depending on which of the first, second or third positions the moveable support structure 1023 is in at a given time.

In FIG. 4 it can be seen that when the movable support 1023 of camera calibration apparatus 1000 is in a second position, the second target 1022 will be facing the camera 1011 and the distance between the target 1022 and camera 1011 will be D1 1102. Light from the second test pattern 1022 travels directly to camera 1011.

In FIG. 5 it can be seen that when the movable support 1023 of camera calibration apparatus 1000 is in a first position, the movable mirror 1020 will be positioned facing the first target, e.g., first test pattern including test pattern portions 1026 and 1028, and the camera 1011. The distance between the camera 1011 and target, e.g., first test pattern including first test pattern portions 1026, 1028, will be the combination of the distance D1 1104 between the movable mirror 1020 and the camera 1011 and the distance, represented as D2 1106, between the movable mirror 1020 and the target, e.g., first test pattern including first test pattern portions 1026, 1028, surrounding the camera 1011 which are visible in the mirror 1020. Thus light from first test pattern portion 1026 travels along D2 1106 to mirror 1020 and then along path D1 1104 from mirror 1020 to camera 1011.

In FIG. 6 the movable support 1023 including mirror 1020 of camera calibration apparatus 1000 is shown in a third position. It can be seen in FIG. 6 that by using a double reflections involving the use of the movable mirror 1020 and fixed mirror 1027 a distance between the first test pattern including first test pattern portions 1026, 1028 and the camera 1011 will be a sum of multiple distances D5 1108, which is the distance from a panel 1008 including first test pattern portion 1026 of the target, e.g., first test pattern, to the movable mirror 1020, D6 1110 which is the distance from the movable mirror 1020 to the fixed mirror 1027, D7 1112 which is the distance from the fixed mirror 1027 back to the movable mirror 1020 and D8 1114 which is the distance from the moveable mirror 1020 to the camera 1011.

In some embodiments, an additional target 1037 is mounted on sidewall 1016. Other distances may be achieved to the additional target 1037, e.g., an additional test pattern, mounted on the right side 1016 of the test apparatus if the moveable mirror 1020 is rotated to an angle which reflects the additional target to the camera 1011.

In some embodiments the controller 1035 controls the motor 1024 to rotate the movable support 1023 to each of the positions shown in FIGS. 4, 5 and 6, as well as a position which results in an additional target on right sidewall 1016 being visible to the camera 1011. At each position the modules (1080, 1082, . . . , 1084) of the camera 1011 are operated to capture one or more images of the test pattern visible to the camera when the movable support is at a particular position. The images are stored and used for calibrating the camera 1011.

The controller 1035 includes, in some embodiments, a processor configured to control the motor 1024 to rotate from one position to the next and to control the camera 1011 to take images while the movable support 1023 is at each of the illustrated positions. The controller 1035 may, and sometimes does, include a wired or wireless interface for communicating with the camera, motor, position sensing device and/or illumination devices, to through which control signals are sent to control the taking of images by the camera, rotation of the motor 1024 and/or the illumination of test patterns.

Figure 7:
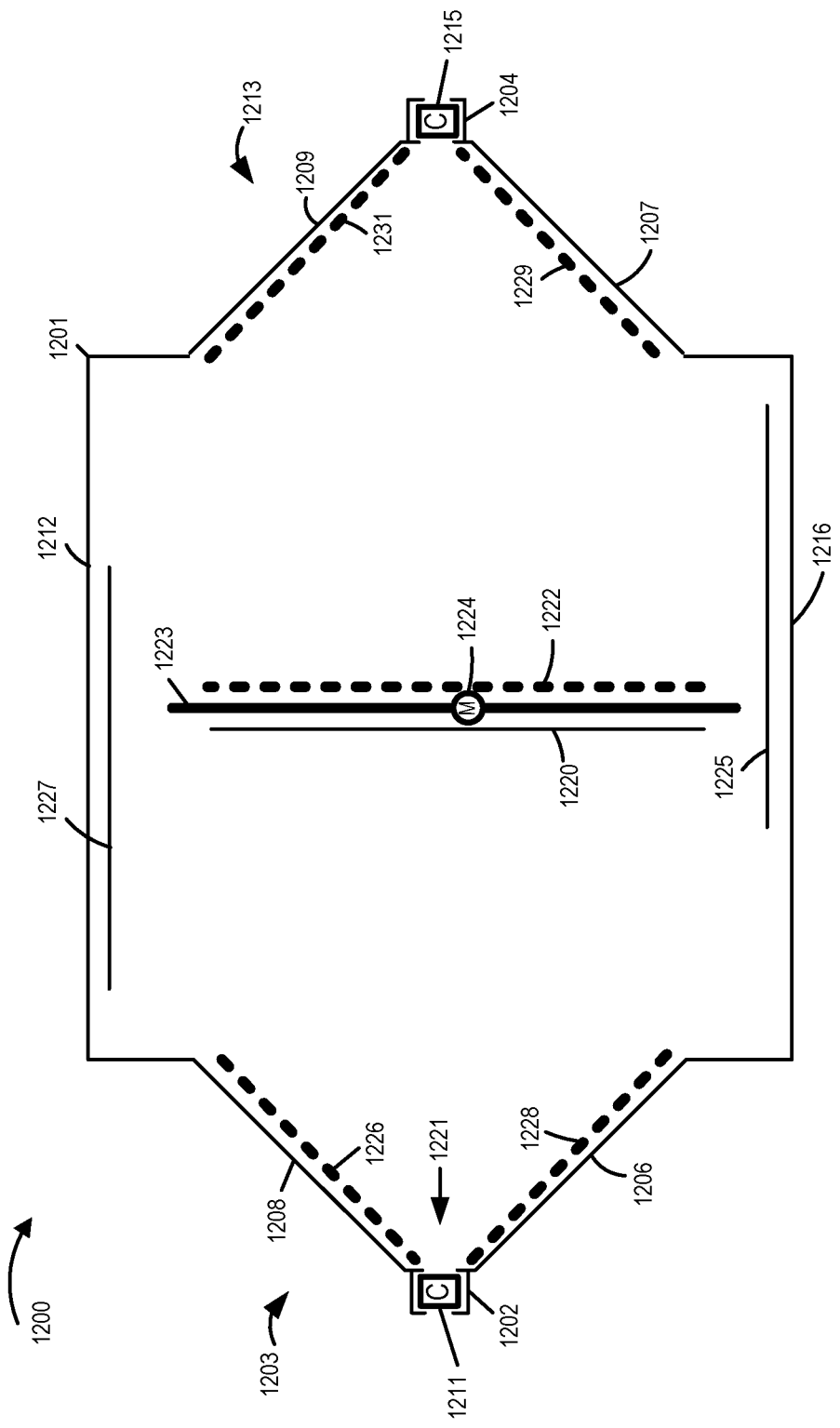
FIG. 7 shows an enhanced camera calibration apparatus having many of the features of the calibration apparatus shown in FIG. 1 but which can be used to calibrate two cameras at the same time, said movable support structure of said enhanced camera apparatus being shown in a first position.

FIG. 7 shows a test apparatus 1200 having many of the features of the test apparatus 1000 shown in FIG. 1. For example, camera holder 1202 in which camera 1211 is held is the same as or similar to camera holder 1002. Similarly each of the following components of FIG. 1 are the same as or similar to the corresponding component of FIG. 12: housing (1001, 1201); first test pattern portion (1026, 1226); first test pattern portion (1028, 1228), second mirror (1027, 1227), first mirror (1020, 1220), movable support structure (1023, 1223), motor (1024, 1224), second test pattern (1022, 1222), sidewall (1012, 1212), sidewall (1016, 1216), panel (1008, 1208), panel (1006, 1206), front side (1003, 1203). While not shown in FIG. 7, the apparatus 1200 also includes a controller 1235 and various lighting elements such as shown in FIG. 1.

The apparatus 1200 differs from the apparatus 1000 in that support for calibration of a second camera 1215 has been added. Wall 1014 is replaced with a wall 1213 that is the same or similar to the construction of the front side (1003, 1203) of test apparatus (1000, 1200) but with the camera port facing inward from the side opposite the front which includes the first camera holder 1202. Thus the camera test apparatus 1200 is generally symmetric with support for testing of a second camera 1215 being provided on the side 1213 opposite the side 1203 in which the first camera 1214 is mounted.

Figure 8:
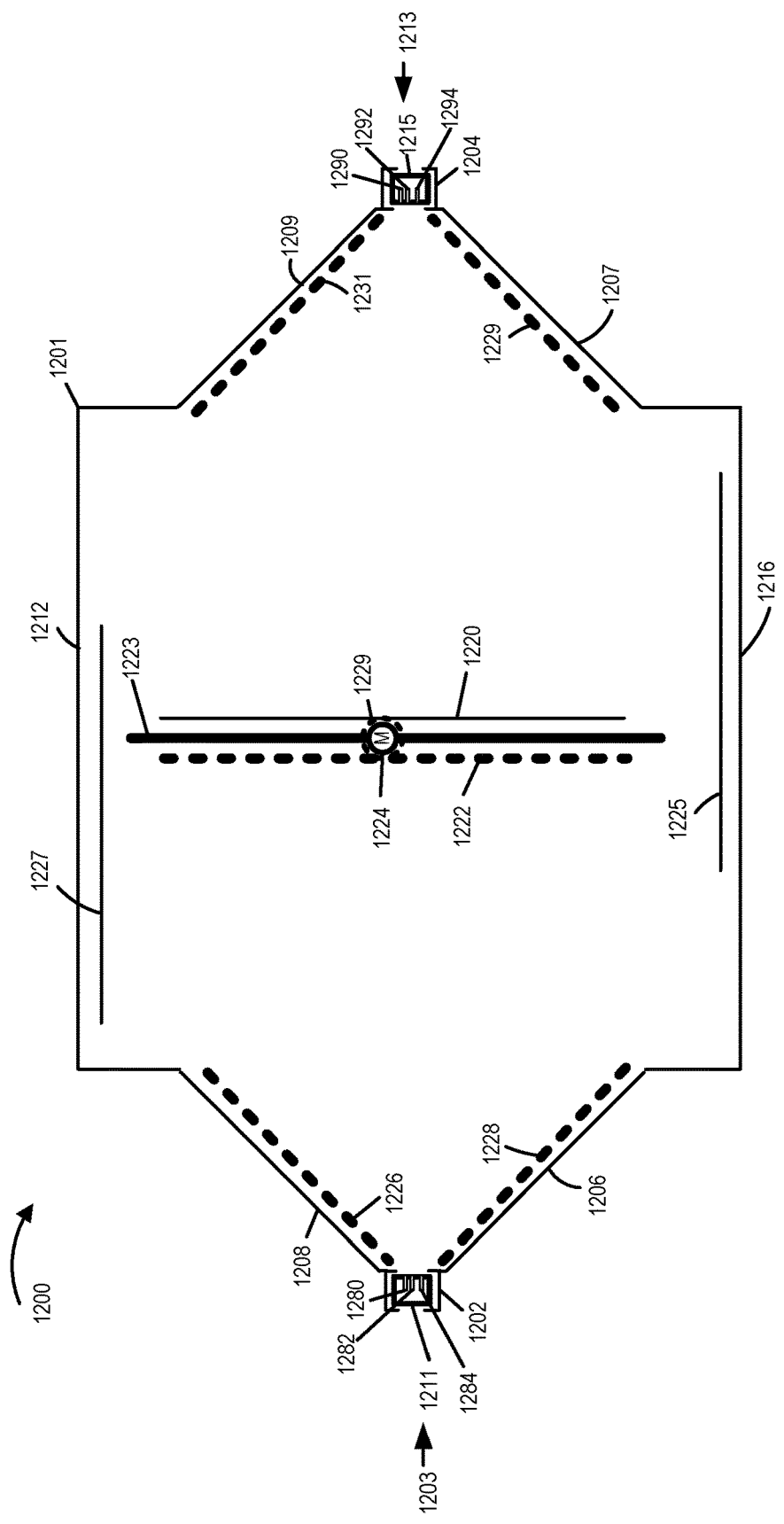
FIG. 8 illustrates the support structure of the apparatus shown in FIG. 7 rotated to a second position to support image capture used to perform camera calibration for one or two mounted cameras, said first position and said second position resulting in different distances between a target and a mounted camera to be calibrated for each of the one or two mounted cameras.
Figure 9:
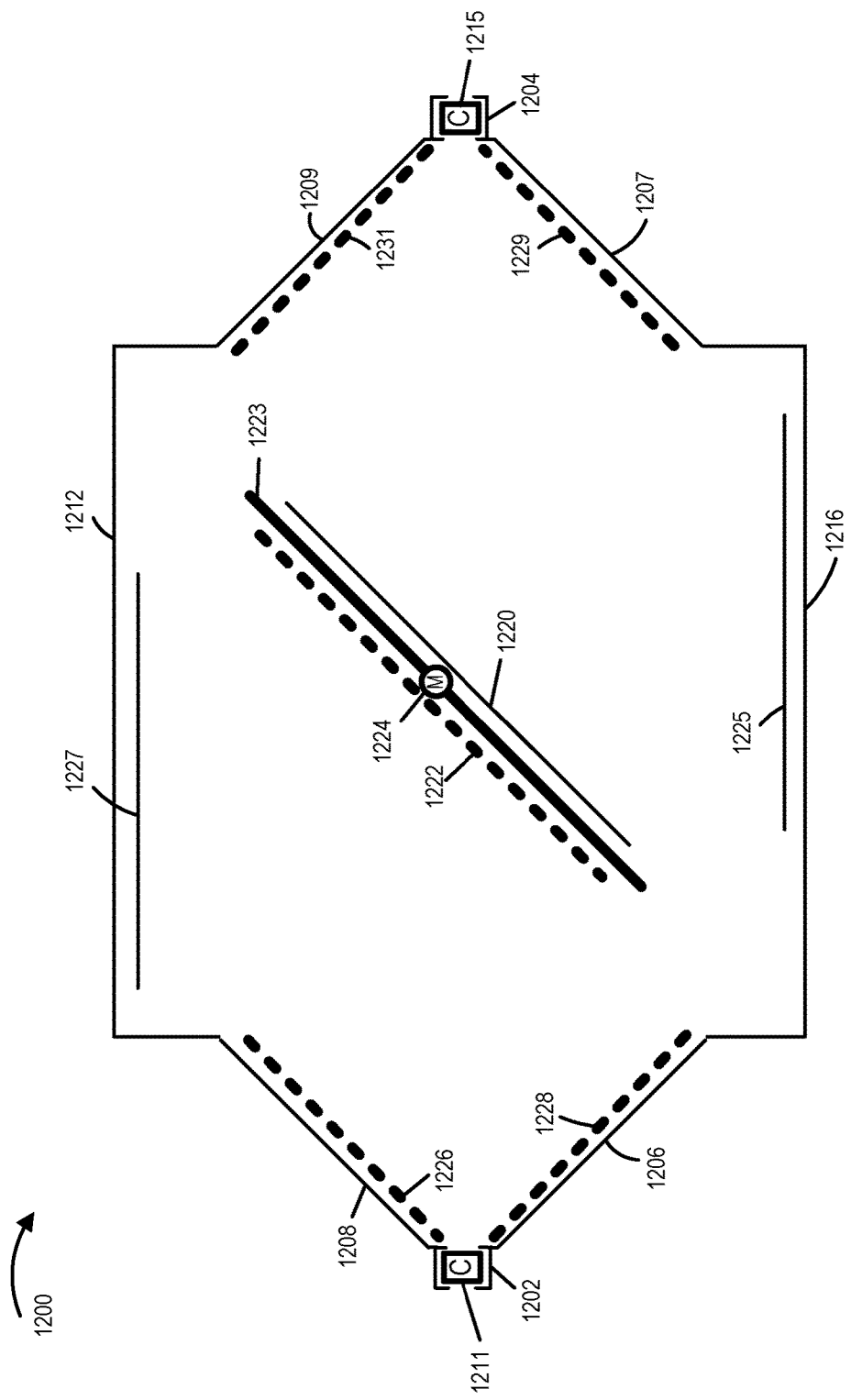
FIG. 9 illustrates the support structure of the apparatus shown in FIG. 7 rotated to a fourth position to support image capture used to perform camera calibration for a second mounted camera, said first position, said second position and said fourth position resulting in different distances between a target and a mounted second camera to be calibrated.
Figure 10:
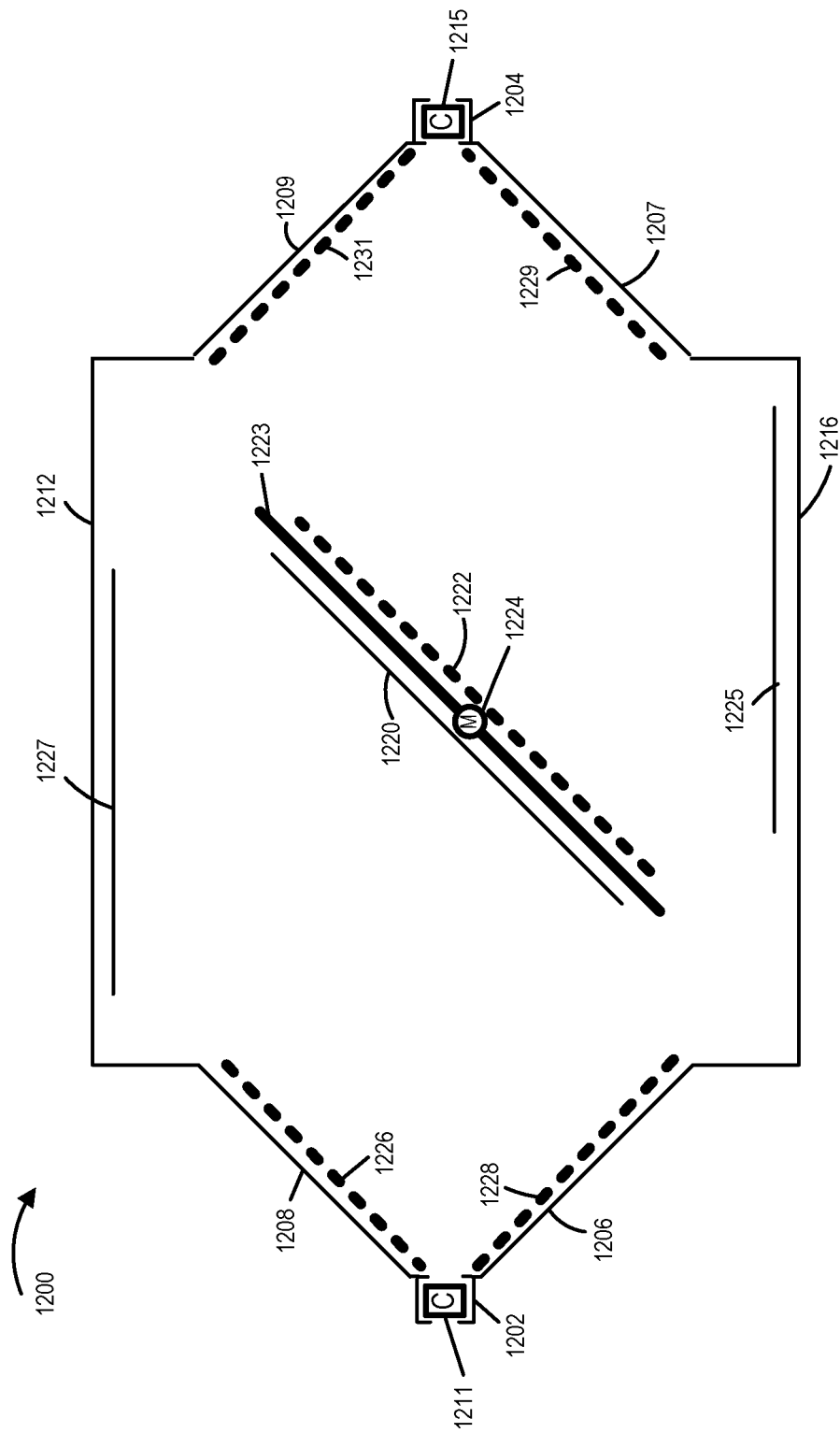
FIG. 10 illustrates the support structure of the apparatus shown in FIG. 7 rotated to a third position to support image capture used to perform camera calibration for a first mounted camera, said first position, said second position, and said third position resulting in different distances between a target and the first mounted camera to be calibrated.

Side 1213 includes a second camera holder 1204, tapered walls including walls 1207, 1209, on which test pattern portion of a third test pattern, e.g., a pyramid test pattern target similar to the one mounted on side 1003 of the test apparatus 1000 or the one is mounted on side 1203 of test apparatus 1200. A second fixed mirror 1225 is included on the right side 1216 of the test apparatus 1200. The configuration shown in FIGS. 7-10 allows two cameras (1214, 1215) to be tested at the same time with the camera, e.g., camera 1215, on one side capturing the flat test pattern, e.g., second test pattern 1222, on the back of the movable support 1223 when the other camera, e.g., camera 1214, captures a reflection of a test pattern, e.g., first test pattern including first test pattern portions 1226, 1228, in the mirror 1220 mounted on the movable support 1223. FIGS. 8, 9 and 10 show the movable support 1223 in different positions.

FIG. 8 further illustrates that exemplary camera 1211 includes a plurality of camera modules, e.g., optical chains, (camera module 1 1280, camera module 2 1282, . . . , camera module N 1284); and exemplary camera 1215 includes a plurality of camera modules, e.g., optical chains, (camera module 1 1290, camera module 2 1292, . . . , camera module M 1294). In some embodiments, camera 1211 is the same type of camera as camera 1215 and camera 1211 includes the same number of camera modules, e.g., optical chains, as camera 1215. In some other embodiments, camera 1211 may be, and sometimes is, a different camera type than camera 1215, e.g., with a different number of camera modules. FIG. 8 further illustrates a position sensing device 1229, e.g., a syncho, resolver, optical position sensor, etc., included in some embodiments, which senses the position of the movable support structure 1223.

FIG. 7 illustrate a position of the movable support 1223 of camera calibration apparatus 1200 in a first position in which a first test pattern including first test pattern portions 1226, 1228 is visible to said first camera 1211. While the movable support 1223 is in the position of FIG. 7, controller 1235 controls the one or more modules (1280, 1282, . . . , 1284) in the first camera 1211 to capture an image of the first test pattern including first test pattern portions 1226, 1228. FIG. 7 further illustrates that in the first position of the movable support 1223, second test pattern 1222 is visible to said second camera 1215 after reflection in first mirror 1220. While the movable support 1223 is in the position of FIG. 7, controller 1235 controls the one or more modules (1290, 1292, . . . , 1294) in the second camera 1215 to capture an image of the second test pattern 1222.

FIG. 8 illustrate a second position of the movable support 1223 of camera calibration apparatus in which a second test pattern 1222 is visible to said first camera 1211. While the movable support 1223 is in the second position of FIG. 8, controller 1235 controls the one or more modules (1280, 1282, . . . , 1284) in the first camera 1211 to capture an image of the second test pattern 1222. FIG. 8 further illustrates that in the second position of the movable support 1223, the third test pattern including test pattern portions (1231, 1229) is visible to said second camera 1215 after reflection in first mirror 1220. While the movable support 1223 is in the second position of FIG. 8, controller 1235 controls the one or more modules (1290, 1292, . . . , 1294) in the second camera 1215 to capture an image of the third test pattern including test pattern portions (1231, 1229) on panels (1209, 1207), respectively.

FIG. 9 illustrate a fourth position of the movable support 1223 of camera calibration apparatus 1200 in which a third test pattern including test pattern portions (1231, 1239) is visible to said second camera 1215 after being reflected by said first mirror 1220 and a third mirror 1225, e.g., in a similar manner to the example of FIG. 6. While the movable support 1223 is in the fourth position of FIG. 9, controller 1235 controls the one or more modules (1290, 1292, . . . , 1294) in the second camera 1215 to capture an image of the third test pattern including third test pattern including third test pattern portions 1231, 1229.

FIG. 10 illustrate a third position of the movable support 1223 of camera calibration apparatus 1200 in which the first test pattern 300 including test pattern portions (1226, 1228) is visible to said first camera (1211) after being reflected by said first mirror 1220 and a second mirror 1227, e.g., in a similar manner to the example of FIG. 6. While the movable support 1223 is in the third position of FIG. 10, controller 1235 controls the one or more modules (1280, 1282, . . . , 1284) in the first camera 1211 to capture an image of the first test pattern 300 including third test pattern portions (1226, 1228).

Figure 11:
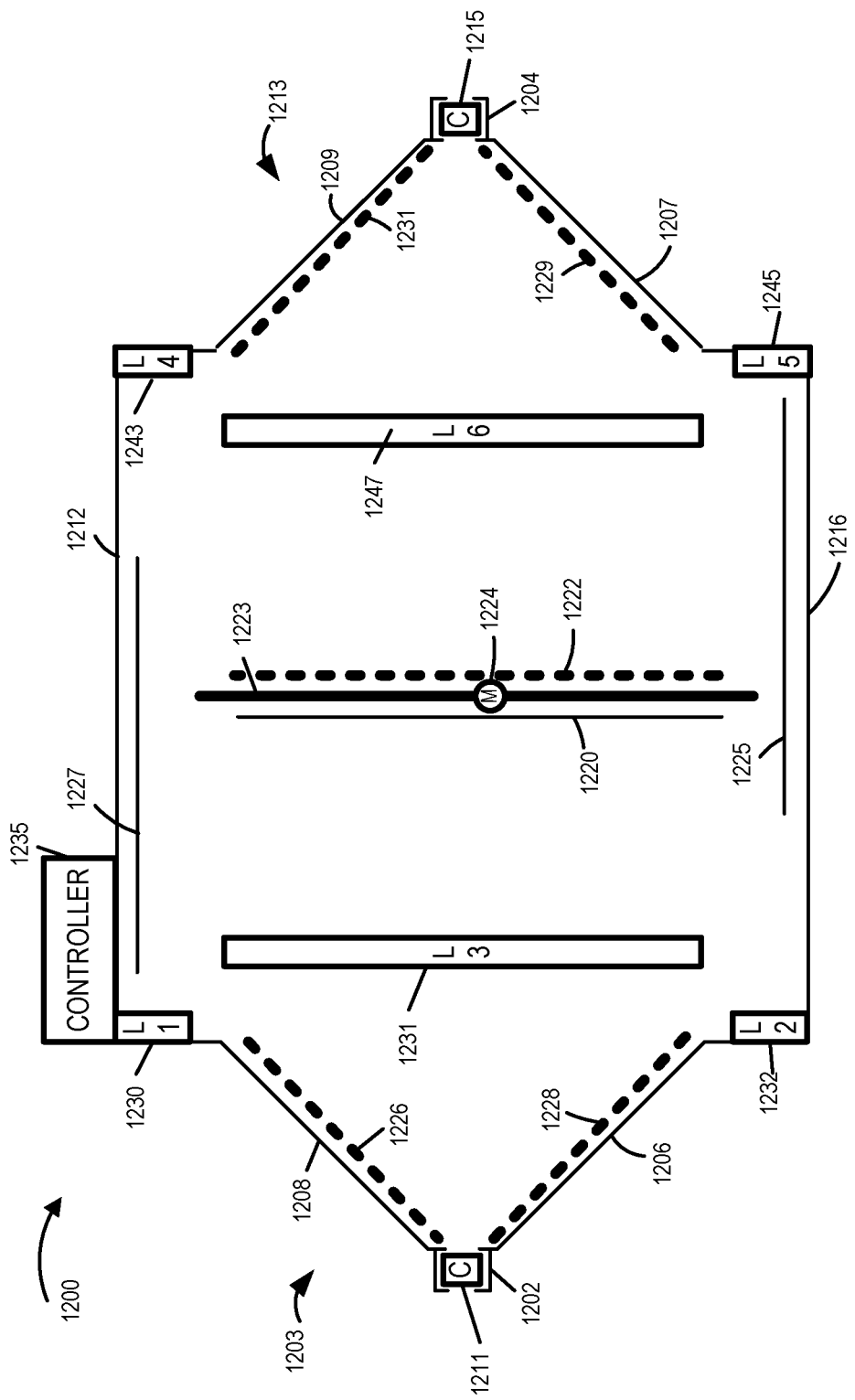
FIG. 11 shows the enhanced camera calibration apparatus of FIG. 7, which can be used to calibrate two cameras at the same time, and further illustrates an included controller and included illumination lighting.

FIG. 11 illustrates the test apparatus 1200 of FIG. 7-10 including a controller 1235 and exemplary lights, e.g., arrays of LEDs (L1 1230, L2 1232, L3 1231, L4 1243, L5 1245, and L6 1247. In one exemplary embodiment, L3 1231 is used to illuminate a first test pattern 300 including first test pattern portions (1226, 1228) when the first camera 1211 is facing first mirror 1220; L1 1230 and L2 1232 are used to illuminate second test pattern 1222 when said second test pattern 1222 is facing the first camera 1211; L6 1241 is used to illuminate a third test pattern, e.g., test pattern 300, including third test pattern portions (1231, 1229) when the second camera 1215 is facing first mirror 1220; L4 1243 and L5 1245 are used to illuminate second test pattern 1222 when said second test pattern 1222 is facing the second camera 1215. In one exemplary embodiment, the first test pattern is the same as the third test pattern. In one such embodiment, the first and third test patterns are test pattern 300 of FIG. 17. In various embodiments, the second test pattern 1222 is the same as second test pattern 1022.

Various variations on the above described embodiments are possible. The figures following FIG. 10 show various features of one or more exemplary test apparatus. The features may be used alone or in combination.

The test pattern on the moveable support, e.g., second test pattern 1022 or 1222 on movable support 1023 or 1223, in some embodiments is a checkerboard pattern printed at high dpi, e.g., 300 DPI or higher. In the case of the sloped test pattern, e.g., a first test pattern 300 including first test pattern portions (1026, 1028), (1226, 1228), or (1231, 1229), a checkerboard pattern is used in some embodiments with color markers or other identifiers such a QR codes or easily identification patterns being included on different sides of the pattern to allow for easy identification of different panels, e.g., sides, of a test pattern. In some, but not necessarily all, embodiments the use of color or other identifying marks on different panels enables correspondence across minimally overlapping field-of-views to be determined. In some embodiments, markers are used to identify a panel portion top from a panel portion bottom.

The apparatus, e.g., apparatus 1200, can be configured to support image capture by two devices, e.g., camera 1211 and camera 1215, through the use of camera holders (1202, 1204) at different sides (1203, 1213) of the apparatus 1200.

In various embodiments rotation of the moveable mirrors, e.g., mirror 1020 or 1220, allows for changes in the distance between the camera and the target image being captured by a camera without having to move the camera. In one particular exemplary embodiment when the moveable mirror is at a 0 degree position, the distance, e.g., light path distance, between the 4 sided target, e.g., first test pattern 300, mounted around the camera holder and the camera will be 250 cm, with the camera capturing the reflection of the target in the movable mirror. When the movable mirror is at 45 degrees the image of the target, e.g., first test pattern, surrounding the holder will be reflected in both the moveable mirror and a mirror on the sidewall of the apparatus resulting in a target to camera distance of 130 cm. When the moveable mirror is at 180 degrees the target, e.g., second test pattern, on the back of the movable mirror will be visible to the camera in the camera holder and the distance between the camera and the flat target mounted on the movable support will be 80 cm. Movement of the moveable support to a −45 degrees position can achieve an arbitrary distance by placing the view of the camera on the right wall accordingly.

In some embodiments at least one of the targets, e.g., the first test pattern 300, is a pyramid shaped target or any other shaped target having a larger number of planes than a simple flat target to get more planes including test patterns in one shot. This approach can reduce the number of images required for geometric calibration as compared to apparatus and/or methods which capture a single plane in each image.

Illumination of test targets, e.g., first test pattern 300, can be archived using a thin illuminant facing the test target, e.g., the pyramid. For example, a set of LED strips, arraigned in a rectangle or square, face the test target, to light the test target, e.g., pyramid test target, uniformly.

Color calibration may take into consideration non-uniform illuminates with knowledge of the illumination characteristics being taken into consideration when calibrating a camera based on an image or images of test targets captured in the test apparatus. This may include modification to a color chart to handle non-uniform illuminants.

Vignetting may be, and in some embodiments is, achieved as part of the test process. In some embodiments, vignetting includes using a thin, flat-field illuminant on the side wall of the box and positioning the mirror at −45 degrees.

Figure 12:
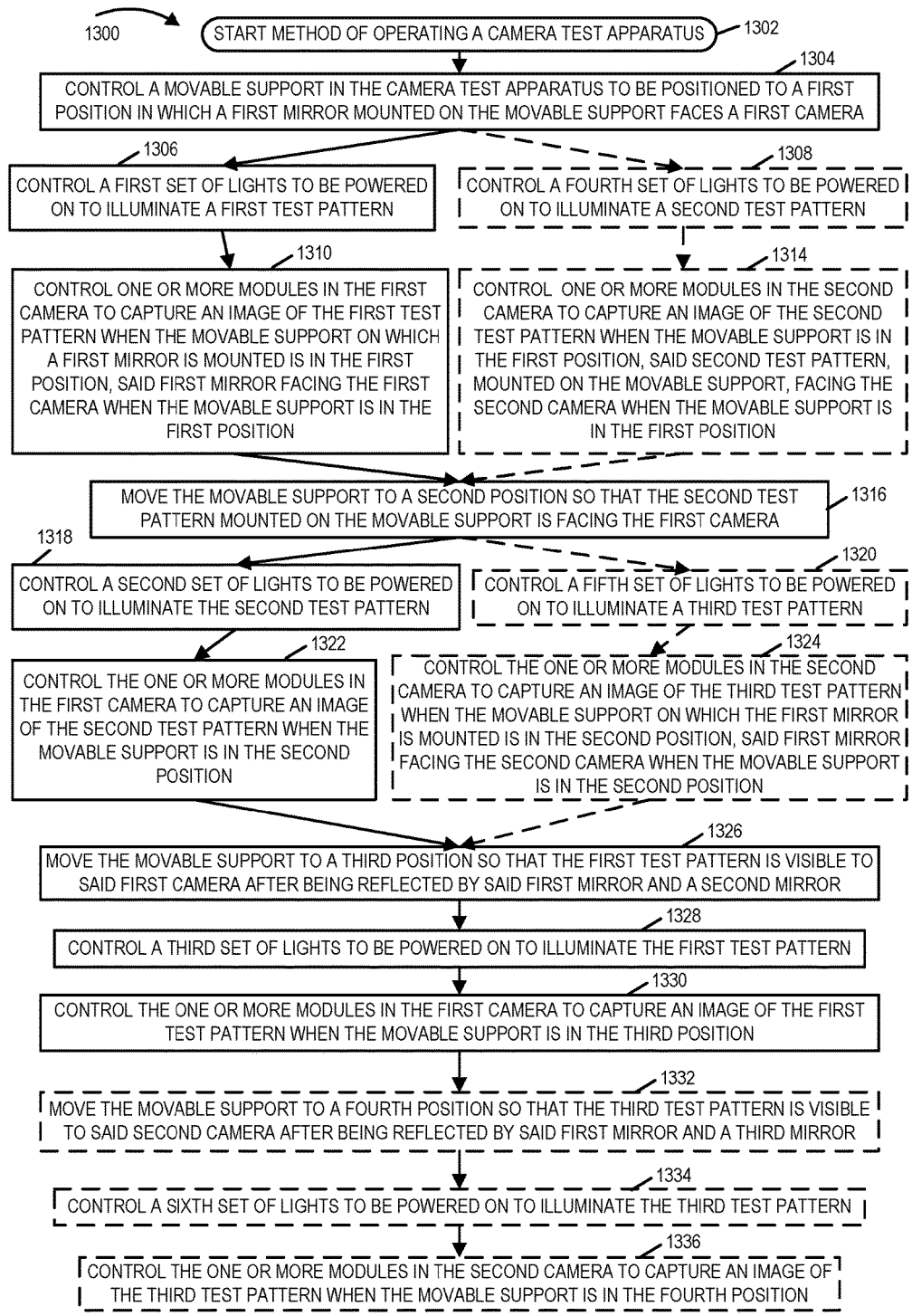
FIG. 12 is a flowchart of an exemplary method of operating a camera test apparatus, e.g., a camera calibration device, in accordance with various exemplary embodiments.

FIG. 12 is a flowchart 1300 of an exemplary method of operating a camera test apparatus in accordance with various exemplary embodiments. The camera test apparatus implementing the method of flowchart 1330 is, e.g., one of camera calibration apparatus (1000, 1200, or 200). Operation starts in step 1302 in which the camera test apparatus is powered on and initialized. Operation proceeds from step 1302 to step 1304. In step 1304 the camera test apparatus controls a movable support in the camera test apparatus to be positioned to a first position in which a first mirror mounted on the moveable support faces a first camera device. Operation proceeds from step 1304 to step 1306 and, in some embodiments, to step 1308.

In step 1306 the camera test apparatus controls a first set of lights to be powered on to illuminate a first test pattern. In step 1308, the camera test apparatus controls a fourth set of lights to be powered on to illuminate a second test pattern.

Operation proceeds from step 1306 to step 1310, and in some embodiments, from step 1308 to step 1314. In step 1310, the camera test apparatus control one or more modules in a first camera to capture an image of the first test pattern when the movable support on which the first mirror is mounted is in the first position, said first mirror facing the first camera when the movable support is in the first position. In step 1314 the camera test apparatus controls one or more modules in a second camera to capture an image of the second test pattern when the movable support is in the first position, said second test pattern mounted on the support facing the second camera when the movable support is in the first position. Operation proceeds from steps 1310 and 1314 to step 1316.

In step 1316 the camera test apparatus moves the movable support to a second position so that the second test pattern mounted on the movable support is facing the first camera. Operation proceeds from step 1316 to step 1318, and in some embodiments, to step 1320. In step 1318 the camera test apparatus controls a second set of lights to be powered on to illuminate the second test pattern. In step 1320 the camera test apparatus controls a fifth set of lights to be powered on to illuminate the third test pattern. Operation proceeds from step 1318 to step 1322, and in some embodiments, from step 1320 to step 1324. In step 1322 the camera test apparatus controls the one of more modules in the first camera to capture an image of the second test pattern when the movable support is in the second position. In step 1324 the camera test apparatus controls the one or more modules in the second camera to capture an image of the third test pattern when a movable support on which the first mirror is mounted is in the second position, said first mirror facing the second camera when the movable support is in the second position. Operation proceeds from step 1322 and step 1324 to step 1326.

In step 1326 the camera test apparatus moves the movable support to a third position so that the first test pattern is visible to said first camera after being reflected by said first mirror and a second mirror. Operation proceeds from step 1326 to step 1328, in which the camera test apparatus controls a third set of lights to be powered on to illuminate the first test pattern when the movable support is in the third position. Operation proceeds from step 1328 to step 1330. In step 1330 the camera test apparatus controls the one or more modules in the first camera to capture an image of the first test pattern when the movable support is in the third position. In some embodiments, operation proceeds from step 1330 to step 1332.

In step 1332 the camera test apparatus moves the movable support to a fourth position so the third test pattern is visible to said second camera after being reflected by said first mirror and a third mirror. Operation proceeds from step 1332 to step 1334, in which the camera test apparatus controls a sixth set of lights to be powered on to illuminate the third test pattern. Operation proceeds from step 1334 to step 1336, in which the camera test apparatus controls the one or more modules in the second camera to capture an image of the third test pattern when the movable support is in fourth position.

In one exemplary embodiment, the camera test apparatus implementing the method of flowchart 1300 is camera calibration apparatus 1000 of FIG. 1-6, and the first camera is camera 1011, e.g., a camera including multiple, e.g., 16, camera modules, e.g., optical chains. In some such embodiments, the first camera and the second camera are the same type of camera, and the first test pattern including first test pattern portions (1226, 1228) is the same or nearly identical to the third test pattern including third test pattern portions (1231, 1229). In some embodiments, the first test pattern and the third test pattern include different identification information, e.g., different identification markers. In various embodiments, an exemplary camera to be calibrated may be installed in either one of holder 1202 or 1204, with the expectation to obtain a substantially identical calibration.

In various embodiments in which the camera test apparatus implementing the method of flowchart 1300 supports calibration of a single calibration device at a time but does not support calibration of two camera devices simultaneously, optional steps 1308, 1314, 1320, 1324, 1332, 1334 and 1336 are not performed. FIG. 2 illustrates movable support 1023 of camera calibration device 1000 in the first position, in which first mirror 1020 faces first camera 1011, which corresponds to the controlled position of step 1304. First set of lights is, e.g., the set={L5 1031, L3 1034, L4 1036} which are controlled in step 1326 to illuminate the first test pattern including first test pattern portion (1026, 1028). FIG. 5 illustrates exemplary image capture by first camera 1011 corresponding to step 1310.

FIG. 1 illustrates the movable support 1023 in the second position so that the second test pattern 1022 faces the first camera 1011, and is resulting position of the controlled move, e.g., via motor 1024, of step 1316. Second set of lights is, e.g., the set={L1 1030, L2 1032} which are controlled in step 1318 to illuminate second test pattern 1022. FIG. 4 illustrates exemplary image capture by first camera 1011 corresponding to step 1322.

FIG. 3 illustrates the movable support 1023 in the third position so that the first test pattern including first test pattern portions (1026, 1028) is visible to the first camera 1011 after being reflected by the first mirror 1020 and the second mirror 1027, and is resulting position of the controlled move, e.g., via motor 1024, of step 1326. Third set of lights is, e.g., the set={L3 1034, L4 1036, L5 1031} which are controlled in step 1328 to illuminate first test pattern including first test pattern portions (1026, 1028). In some other embodiments, the third set of lights is different from the first set of lights, e.g., the third set of lights is, e.g., the set={L3 1034, L4 1036}. FIG. 6 illustrates exemplary image capture by first camera 1011 corresponding to step 1330.

In another exemplary embodiment, the camera test apparatus implementing the method of flowchart 1300 is camera calibration apparatus 1300 of FIGS. 7-11, the first camera is camera 1214, e.g., a camera including multiple, e.g., 16, camera modules, e.g., optical chains, and the second camera is camera 1215, e.g., a camera including multiple, e.g., 16, optical chains. In such an embodiment, optional steps 1308, 1314, 1320, 1324, 1332, 1334 and 1336 are performed. FIG. 7 and FIG. 11 illustrates movable support 1223 in the first position, in which first mirror 1220 faces first camera 1214 and the second test pattern 1222 faces the second camera 1215, which corresponds to the controlled position of step 1304. First set of lights is, e.g., the set={L3 1231} which are controlled in step 1026 to illuminate the first test pattern including first test pattern portion (1226, 1228). Fourth set of lights is, e.g., the set={L4 1243, L5 1245} which are controlled in step 1308 to illuminate second test pattern 1222.

FIG. 8 illustrates the movable support 1223 in the second position so that the second test pattern 1222 faces the first camera 1214 and the first mirror 1220 faces the second camera 1215, and is resulting position of the controlled move, e.g., via motor 1224, of step 1316. Second set of lights is, e.g., the set={L1 1230, L2 1232} which are controlled in step 1318 to illuminate second test pattern 1222. Fifth set of lights is, e.g., the set={L6 1247} which are controlled in step 1320 to illuminate the third test pattern including third test pattern portions (1231, 1229).

FIG. 10 illustrates the movable support 1223 in the third position so that the first test pattern including first test pattern portions (1226, 1228) is visible to the first camera 1214 after being reflected by the first mirror 1220 and the second mirror 1227, and is resulting position of the controlled move, e.g., via motor 1224, of step 1226. Third set of lights is, e.g., the set={L3 1231} which are controlled in step 1328 to illuminate including first test pattern including portions (1226, 1228). In some other embodiments, the third set of lights is different from the first set of lights.

FIG. 9 illustrates the movable support 1223 in the fourth position so that the third test pattern including third test pattern portions (1231, 1229) is visible to the second camera 1215 after being reflected by the first mirror 1220 and the third mirror 1225, and is resulting position of the controlled move, e.g., via motor 1224, of step 1330. Sixth set of lights is, e.g., the set={L6 1247} which are controlled in step 1334 to illuminate the third test pattern including third test pattern portions (1231, 1229). In some other embodiments, the sixth set of lights is different from the fifth set of lights.

Figure 13:
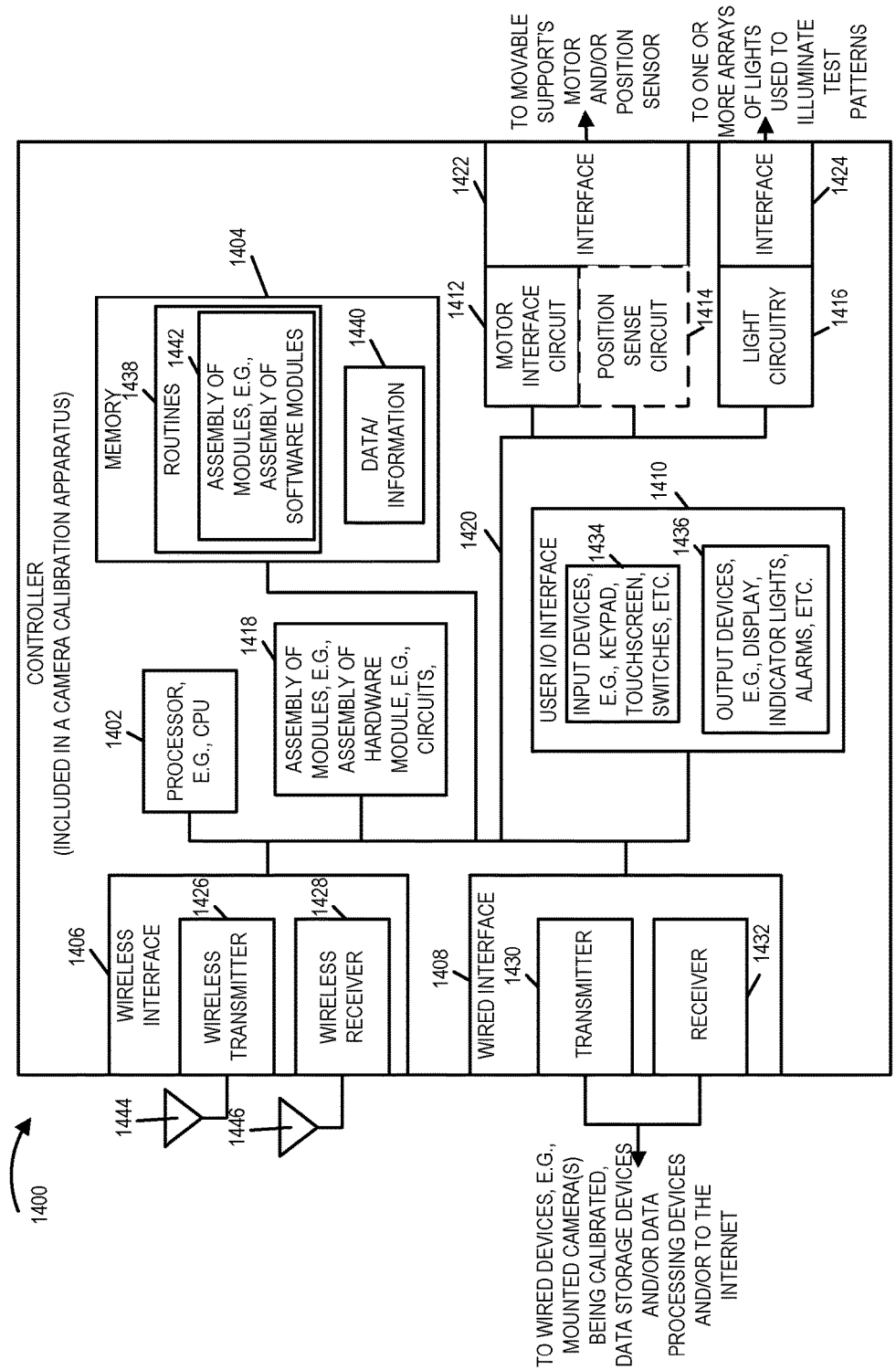
FIG. 13 illustrates an exemplary controller which may be included in a camera test apparatus, e.g., camera test apparatus of FIG. 1 or camera test apparatus of FIG. 11.

FIG. 13 is a drawing of an exemplary camera calibration device controller 1400 in accordance with an exemplary embodiment. Controller 1400 is, e.g., controller 1035 of camera calibration apparatus 1000 shown in FIG. 1 or controller 1235 of camera calibration apparatus 1200 shown in FIG. 11. Exemplary controller 1400 includes a processor 1402, e.g., a CPU, a memory 1404, a wireless interface 1406, a wired interface 1408, a user I/O interface 1410, a motor interface circuit 1412, optionally a position sense circuit 1414, light circuitry 1416, and an assembly of modules 1418, e.g., an assembly of hardware modules, e.g., circuits, coupled together via a bus 1420 via which the various elements may interchange data and information. In some embodiments, exemplary camera calibration device controller 1400 is a movable support position and camera controller for controlling the position of a moveable support to switch between different predetermined positions and for controlling a first camera mounted in a first camera holder to operate camera modules included in said first camera to capture images when said movable support is at multiple different ones of said predetermined positions. In various embodiments, the exemplary controller 1400 further controls a second camera mounted in a second camera holder to operate camera modules included in said second camera to capture images when said movable support is at multiple different ones of said predetermined positions.

Wireless interface 1406 includes a wireless transmitter 1426 coupled to a transmit antenna 1444, and a wireless receiver 1428 coupled to a receive antenna 1446. In some embodiments, the same antenna is used for both transmit and receive. In various embodiments, the wireless interface 1406 supports Bluetooth, WiFi, and cellular communications, e.g., LTE cellular. In some embodiments, controller 1400 communications with a camera device being calibrated using the wireless interface 1406, e.g., receiving device model and/or serial number (S/N) information, controlling one or more modules in the camera to capture images of a test pattern at a particular time in a test sequence using particular controlled camera settings, receiving captured images of test patterns for subsequent processing to determine calibration parameters, and/or communicating determined calibration parameters to the camera.

Wired interface includes transmitter 1430 and receiver 1432. Wired interface 1408 is coupled to wired devices, e.g., a mounted camera to be calibrated, a data storage device, and/or a data processing device, and/or the Internet. Information communicated via wired interface 1408 is the same or similar to information communicated via wireless interface 1406. In some embodiments, controller 1400 includes one of wireless interface 1406 and wired interface 1408.

User I/O interface 1410 includes input devices 1434, e.g., a keypad, a touch screen, switches, etc., and output devices 1436, e.g., display, indicator lights, alarms, speaker, etc. The input devices 1434 are used to receiver input, e.g., from a test operator, e.g., to start a test, to identify the camera device(s) being calibrated, e.g. by model and serial number, etc, to initiate an emergency shutdown, etc. The output devices 1436 are used to indicate status information to a test operator, e.g., calibration in progress, calibration complete, test apparatus self-test failure, test apparatus failure, camera device calibration pass, camera device calibration fail, determined camera quality metrics, etc., and/or to output calibration parameters and/or information used to derive calibration parameters.

Motor interface circuit 1412, e.g., a motor control circuit and/or a motor drive circuit, is coupled to interface 1422. In some embodiments, the motor control circuit sends different digital control signals corresponding to different predetermined position of a motor shaft. In some embodiments, the motor drive circuit includes a power amplifier circuit. Position sense circuit 1414, e.g., circuitry for interfacing and/or converting a signal from a position sensing device, e.g., measuring movable support position and/or motor shaft position, is coupled to interface 1422. In some embodiments, the position sense circuit 1414 includes an A/D converter. Interface 1422 is coupled to a movable support motor, e.g., motor 1204 or motor 1224, and in some embodiments, a movable support position sensor, e.g., a resolver, synchro, optical position indicator, etc., used to indicate a rotary position of the movable support, e.g., movable support 1203 or movable support 1223. In some embodiments, in which the optional position sense circuit is not included, the desired position of the movable support device is controlled via an open loop control approach. In some other embodiments, the desired position of the movable support device is controlled using a closed loop control approach and the position sense circuit 1414 is included.

Light circuitry 1416, e.g. switching activation/deactivation circuitry, intensity control circuitry, and power driver circuitry, is coupled to interface 1424. Interface 1424 is coupled to one or more arrays of lights, e.g., arrays of LEDs used to illuminate test patterns during image capture, e.g., different sets of LEDs being controlled to be illuminated at different times in the calibration sequence corresponding to different positions of the movable support.

Memory 1404 includes routines 1438 and data/information 1440. Routines 1438 includes assembly of modules 1442, e.g., an assembly of software modules. Data/information 1440 includes test pattern information, e.g., including test pattern marker information, camera type information, camera S/N information, captured images, test sequence information, calculated calibration parameters, pass/fail criteria, pass/fail information, camera control information, movable support control information, light control information, communications protocol information, information mapping different predetermined positions of the movable support structure to different sets of lights to be illuminated and to different control information to be communicated to a camera device installed in a particular camera holder.

In some embodiments, controller 1400 is used in a camera test apparatus (1000 or 1200 or 200), and memory 1404 includes instructions for controlling movement of a movable support (1023 or 1223) between different positions and to control a camera (1011 or 1211) to take images while at said different positions. In some such embodiments, processor (1402) is configured to control the test apparatus (1000 or 1200 or 200) in accordance with said instructions when said instructions are executed, and said processor (1402) is configured to: control one or more modules ((1080, 1082, . . . , 1084) or (1280, 1282, 1284)) in a camera (1011 or 1211) to capture an image of a first test pattern (300) when a movable support (1023 or 1223), on which a first mirror (1020 or 1220) is mounted, is in a first position, said first mirror (1020 or 1220) facing the camera (1011 or 1211) when the movable support is in the first position; control a motor (1024 or 1224) to move the movable support (1023 or 1223) to a second position so that a second test pattern (1022 or 1222) mounted on the movable support (1023 or 1223) is facing the camera (1011 or 1211); and control the one or more modules ((1080, 1082, . . . , 1084) or (1280, 1282, 1284)) in the camera (1011 or 1211) to capture an image of the second test pattern (1222) when the movable support (1023 or 1223) is in the second position. In some such embodiments, the processor (1402) is further configured to: control the motor (1024 or 1224) to move the movable support (1023 or 1223) to a third position so that the first test pattern (300) is visible to said camera (1011 or 1211) after being reflected by said first mirror (1020 or 1220) and a second mirror (1027 or 1227); and control the one or more modules (1080, 1082, . . . , 1084) or (1280, 1282, 1284)) in the camera (1011 or 1211) to capture an image of the first test pattern (300) when the movable support (1023 or 1223) is in the third position.

Figure 14:
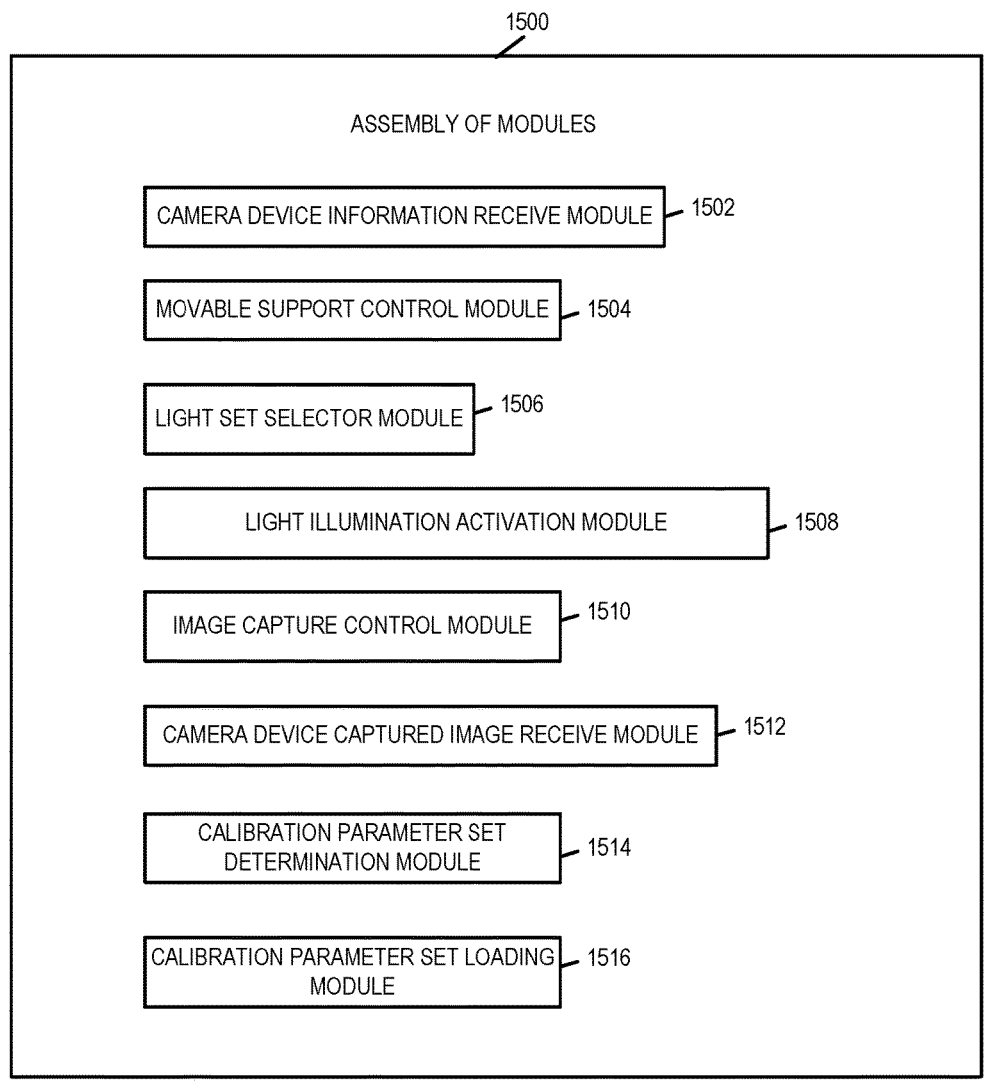
FIG. 14 is a drawing of an assembly of modules which may be included in a controller in a camera test apparatus, e.g., a camera calibration apparatus, in accordance with an exemplary embodiment.

FIG. 14 is a drawing of an assembly of module 1500. In some embodiments, assembly of modules 1500 is implemented, e.g., as assembly of hardware modules 1418, e.g. circuits, of controller 1400 of FIG. 13, e.g., with different modules in assembly of modules 1500 corresponding to different circuits. In some embodiments, assembly of modules 1500 is implemented, e.g., as assembly of modules 1442, e.g., assembly of software modules, of FIG. 13. In still other embodiments, some of the modules in assembly of modules 1500 are implemented as circuits in assembly of hardware modules 1418 and some of the modules in assembly of modules 1500 are implemented as software modules in assembly of modules 1442 of controller 1400 of FIG. 13. In some embodiments, some or all of assembly of modules 1500 are implemented as circuits within processor 1402. Thus assembly of modules may be implemented as hardware, software, or a combination of hardware and software.

Assembly of modules 1500 includes a camera device information receive module 1502, a movable support control module 1504, a light set selector module 1506, a light illumination activation module 1508, an image capture control module 1510, a camera device captured image received module 1512, a calibration parameter set determination module 1514, and a calibration parameter set loading module 1516. Camera device information receive module 1502 is configured to receive information, e.g., camera type information and camera S/N information, from a camera device mounted in a camera holder of the camera calibration apparatus. Movable support control module 1504 is configured to move the movable support in the camera calibration apparatus to different predetermined positions, e.g., a position in which the first mirror on the movable support faces a camera in a first camera mount of the camera calibration apparatus, a second position in which a second test pattern mounted on one side of the movable support faces a camera in a first camera mount of the camera calibration apparatus, and a third position in which a camera in the first camera mount can view a first test pattern after reflections in two mirrors, a second mirror being on a sidewall of the camera calibration apparatus and a first mirror being on the movable support structure. Light set selection module 1506 selects a particular set of illumination lights to be activated to illuminate a particular test pattern during an image capture of the particular test pattern, e.g., different sets being selected corresponding to different test patterns and/or different positions of the movable support structure. Light illumination activation module 1508 is configured to control illumination of the selected set of lights during the time of image capture of a test pattern. Image capture control module 1510 is configured to control a camera device to capture an image, e.g., an image of a test pattern, in accordance with a calibration test sequence being implemented to calibrate a camera device. In some embodiments, the image capture control module sends a control signal to the camera device instructing the camera device to capture an image. Camera device captured image receive module 1512 is configured to received captured images, e.g., captured images of test patterns, from a camera device mounted in the camera calibration apparatus which is being calibrated. Calibration parameter set determination module 1512 is configured to determine one or more set of calibration parameters for a camera device being calibrated, e.g., based on captured images of test patterns and know information corresponding to the test patterns. Calibration parameter set determination module 1512 determines, e.g., a set of alignment corrections and/or a set of color corrections, to be used by the camera device when capturing images. Calibration parameter set loading module 1516 loads a set of determined calibration parameters into a camera device, e.g., to be stored and used by the camera device.

In various embodiments, image capture control module 1510 controls one or more modules in a camera to capture an image of a first test pattern when a movable support on which the first mirror is mounted is in a first position, said first mirror facing the camera when the movable support is in the first position. In some embodiments, the movable support control module 1504 controls the movable support to move to a second position so that a second test pattern mounted on the movable support is facing the camera. In some such embodiments, the image capture control module 1510 further controls the one or more modules in the camera to capture an image of the second test pattern when the movable support is in the second position.

In various embodiments, the movable support control module 1504 further controls the movable support to move to a third position so the first test pattern is visible to said camera after being reflected by said first mirror and said second mirror. In some such embodiments, the image capture control module 1510 controls the one or more modules in the camera to capture an image of the first test pattern when the movable support is in the third position.

Figure 15:
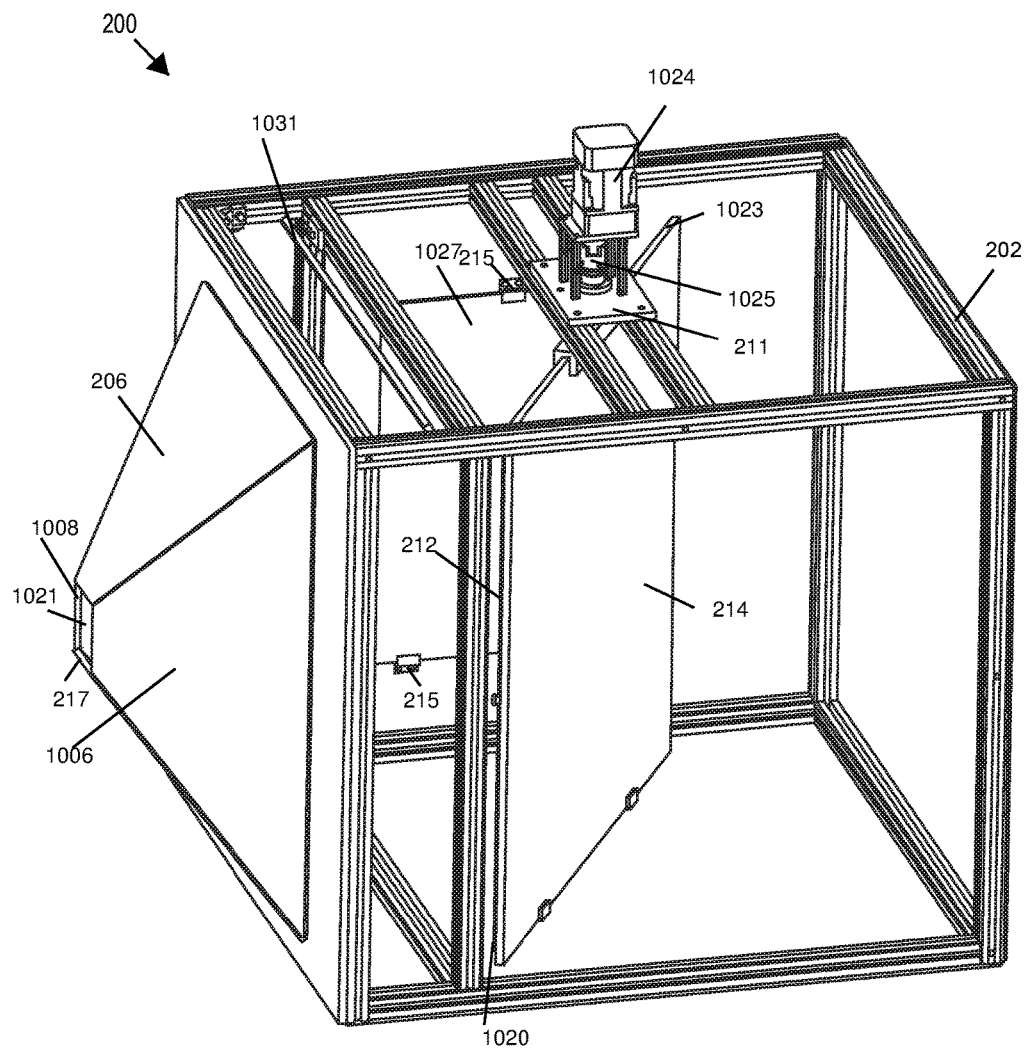
FIG. 15 is a drawing illustrating elements and features of an exemplary camera calibration apparatus in accordance with an exemplary embodiment.

FIG. 15 is a drawing of an exemplary camera calibration apparatus 200 with side and roof panels removed in accordance with an exemplary embodiment. In one embodiment camera calibration apparatus 200 of FIG. 15 is camera calibration apparatus 1000 of FIG. 1. Camera calibration apparatus 200 includes a housing support structure 202, panels (206, 1006, 1008, 217), a motor 1024, a shaft 1025, a motor assembly mount 211, a movable support structure 1023, a first mirror 1020, a second mirror 1027, mirror mounts 215, and a row of lights 1031.

Housing support structure 202 includes beams, e.g., metal beams, attached to one another to support side panels, roof panels, and the movable support structure 1023, thus forming a housing, e.g., housing 101 of FIG. 1. Panels (206, 1006, 1008, 217) are four panels, which are angled to form a sloped surface surrounding opening 1021 corresponding to the position of a camera holder, e.g., camera holder 1002 of FIG. 1. Each of the four panels (206, 1006, 1008, 217) includes a different first test pattern portion mounted on an interior side of the panel. The four different test pattern portions form a first test pattern, e.g., test pattern 300 of FIG. 17. Each individual one of the four test pattern portions of the first test pattern includes an identifying mark, e.g., color mark or unique pattern, which distinguishes the individual one of the multiple first test panel portions from the other ones of the multiple test panel portions. The first test pattern also includes at least on orientation indicator which can be used to distinguish a top of an individual test pattern portion from a bottom of the individual test pattern portion.

Figure 20:
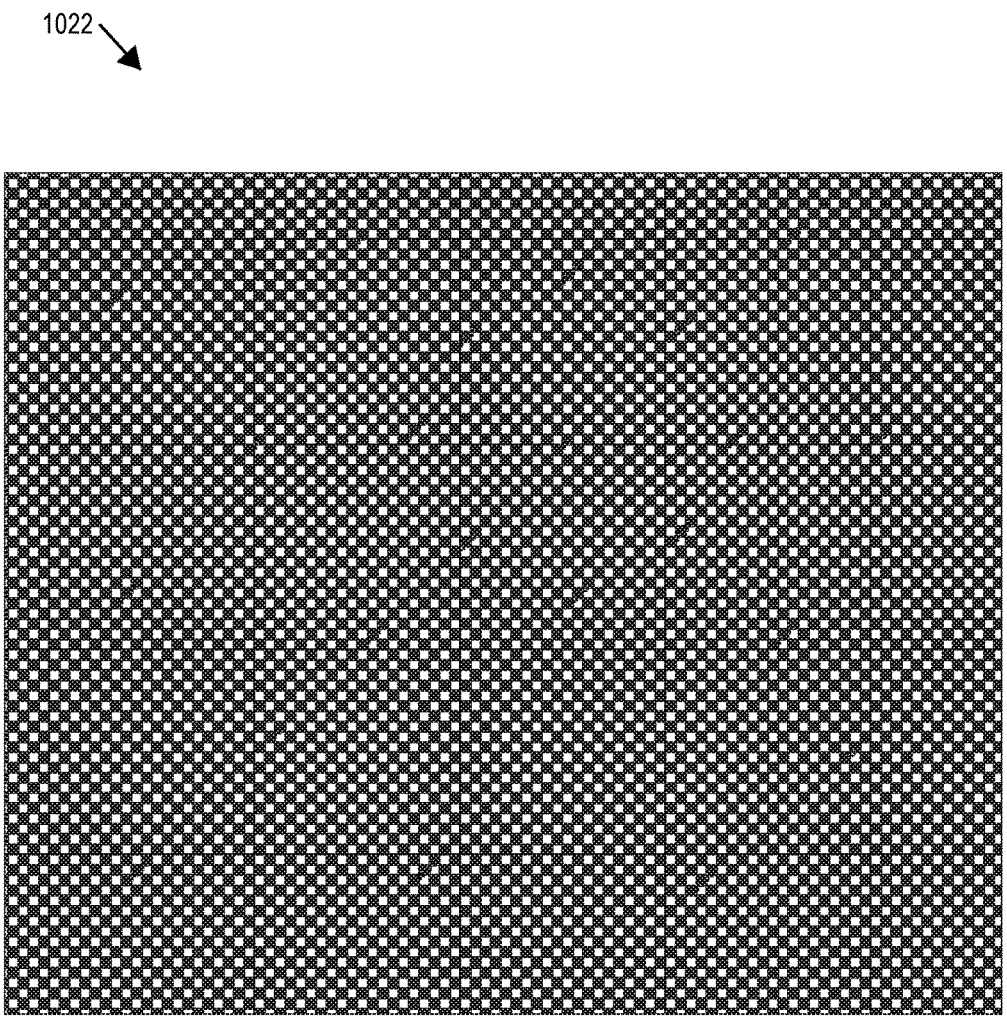
FIG. 20 is a drawing of an exemplary test pattern, e.g., a second test pattern, which may be mounted on a second side of movable support structure in accordance with an exemplary embodiment.

The movable support structure 1023, may be, and sometimes is, rotated in the camera calibration apparatus 200, e.g. to predetermined positions. The first mirror 1020 is mounted on a first side 212 of the movable support structure 1023; and a second test pattern, e.g., test pattern 1022 of FIG. 20, is mounted on a second side 214 of the movable support structure 1023.

Second mirror 1027 is mounted, via mounts 215, on a first sidewall 1012 of the housing in which the movable support structure 1023 is positioned.

Motor 1024 is mounted in a roof of the housing via motor assembly mount 211. Motor 1024 includes motor shaft 1025 which is coupled to the movable support structure 1023. Motor 1024 is attached to the movable support structure 1023 for driving the movable support structure 1023 between different positions, said different positions including a first position in which said first mirror 1020 faces a first test pattern and a camera holder and a second position in which said second test pattern faces the camera holder. The motor 1024 is also for driving the movable support structure 1023 to a third position, in which said first test pattern is reflected in said first and second mirrors (1020, 1027) making the reflection visible to a camera in the camera holder. In FIG. 15 the movable support structure 1023 is shown in the third position. Thus, the first test pattern including first test pattern portions of panels (206, 1006, 1008, 217) are reflected in the first mirror 1020 of movable support structure 1023 and in the second mirror 1027 mounted on the sidewall 1012, making the reflection visible to a camera looking into opening 1021.

Row of lights 1031 is positioned above and in front of the first test pattern for illuminating the first test pattern, e.g., for illuminating the first test pattern 300 which includes first test pattern portion on the interior sides of panels (206, 1006, 1008, 217).

Figure 16:
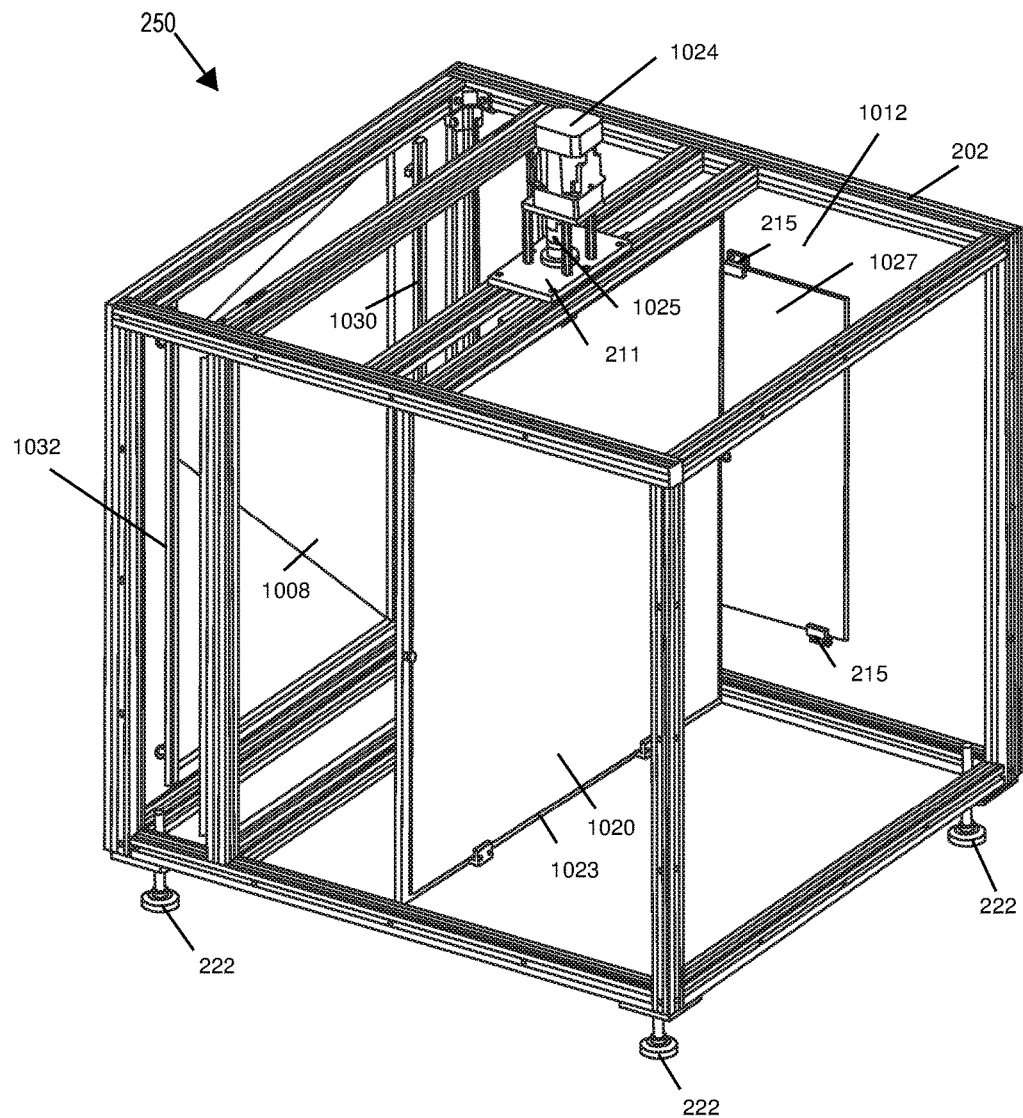
FIG. 16 is another drawing of the exemplary camera calibration apparatus of FIG. 15.

FIG. 16 is another drawing 250 of exemplary camera calibration apparatus 200 in accordance with an exemplary embodiment. In drawing 250 the movable support structure 1023 is in the second position in which the second test pattern faces the camera holder. Drawing 250 also illustrates additional rows of lights (1030, 1032) positioned in front of and one the left and right sides of the first test pattern for illuminating the second test pattern.

FIG. 17 is a drawing of an exemplary test pattern 300, e.g., a first test pattern, which may be included in an exemplary camera calibration apparatus in accordance with an exemplary embodiment. Exemplary test pattern 300 is, e.g., included in the exemplary camera apparatus 200 shown in FIGS. 15 and 16. Test pattern 300 includes four test pattern portions (portion 1 302, portion 2 1028, portion 3 1026, portion 4 308). Each of the different first test pattern portions (302, 1028, 1026, 308) are mounted on different panels (206, 1006, 1008, 217), respectively, and the different panels (206, 1006, 1008, 217) are angled, as shown in FIG. 15, to form a sloped surface surrounding opening 1021 corresponding to the position of a camera holder.

Each individual one of the four first test pattern portions (302, 1028, 1026, 308) includes an identifying mark (310, 312, 314, 316) which distinguishes the individual one of the four first test pattern portions from the other ones of the individual test pattern portions. The identifying mark is, e.g. a color mark or unique pattern. Test pattern portion 1 302 includes identifying mark 310, represented by a strip with horizontal line shading; test pattern portion 2 1028 includes identifying mark 312, represented by a strip with asterisks; test pattern portion 3 1026 includes identifying mark 314 represented by strip with vertical line shading; and test pattern portion 4 308 includes identifying mark 316 represented by a strip with dots. In one embodiment, each of the strips (310, 312, 314, 316) is a different color; for example, strip 310 is red, strip 312 is green, strip 314 is blue, and strip 316 is yellow.

Each individual one of the four test pattern portions (302, 1028, 1026, 308) includes at least one orientation indicator (318, 320, 322, 324), respectively, which can be used to distinguish a top of an individual test pattern portion from a bottom on an individual test pattern portion. Exemplary orientation indicator 318, used for test pattern portion 1 302 is two + symbols, which can be used to distinguish the top 326 of test pattern portion 1 302 from the bottom 328 of test pattern portion 1 302, by its placement location, which is near the top 326 of test pattern portion 1 302. Exemplary orientation indicator 320, used for test pattern portion 2 1028 is three + symbols, which can be used to distinguish the top 330 of test pattern portion 2 1028 from the bottom 332 of test pattern portion 2 1028, by its placement location, which is near the top 330 of test pattern portion 1028. Exemplary orientation indicator 322, used for test pattern portion 3 1026 is four + symbols, which can be used to distinguish the top 334 of test pattern portion 3 1026 from the bottom 336 of test pattern portion 3 1026, by its placement location, which is near the top 334 of test pattern portion 1026. Exemplary orientation indicator 324, used for test pattern portion 4 308 is six + symbols, which can be used to distinguish the top 338 of test pattern portion 4 308 from the bottom 340 of test pattern portion 4 308, by its placement location, which is near the top 338 of test pattern portion 308.

Figure 18:
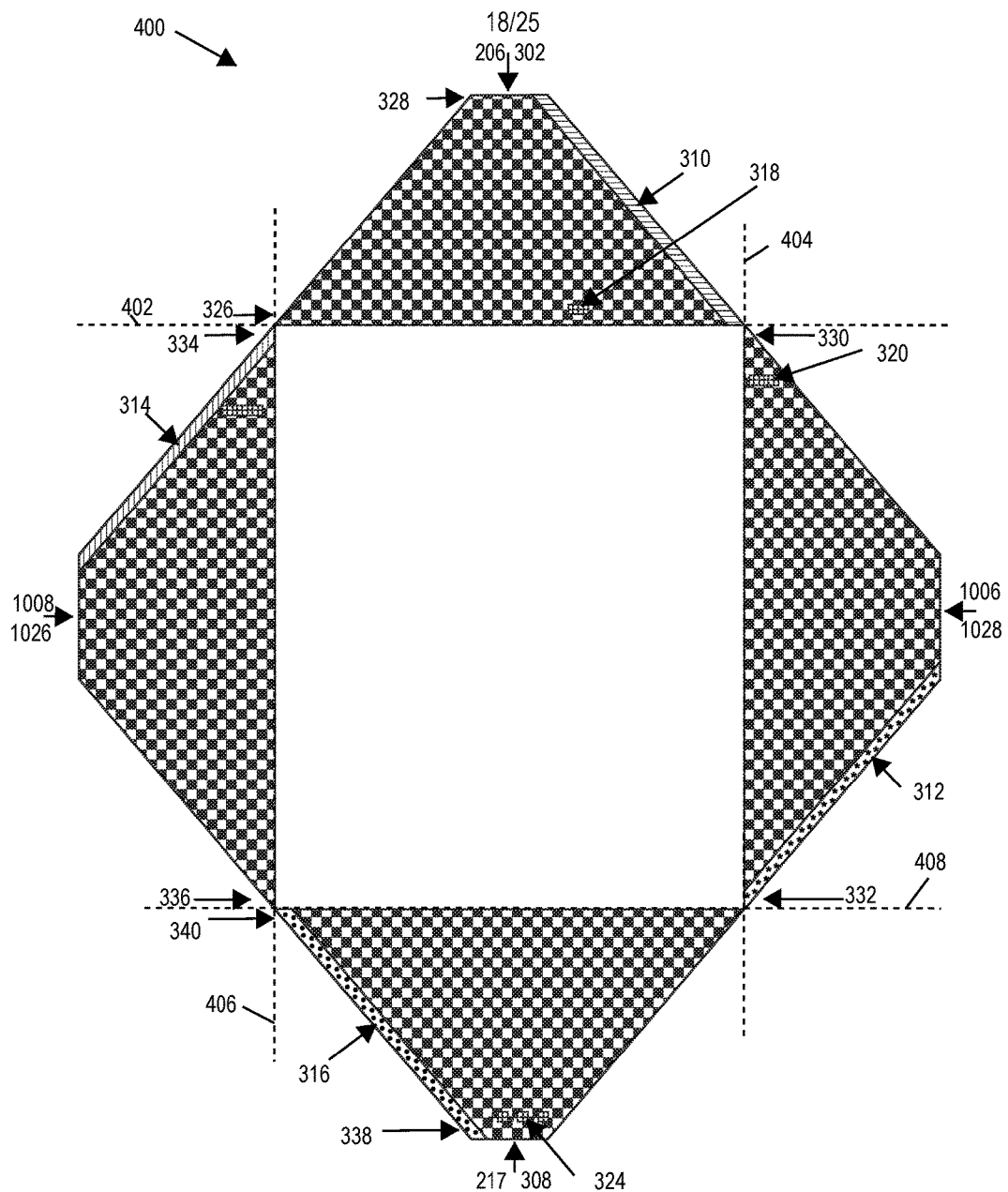
FIG. 18 is a drawing illustrating the four test pattern portions of FIG. 17, which are each mounted on a panel, with the panels shown lying on a flat surface prior to assembly.

FIG. 18 is a drawing 400 illustrating the four test pattern portions (test pattern portion 1 302, test pattern portion 2 1028, test pattern portion 3 1026, test pattern portion 4 308), of exemplar test pattern 300 of FIG. 17 which are each mounted on a panel (206, 1006, 1008, 217), respectively, with the panels, shown lying on a flat surface prior to assembly. During assembly the panels (206, 1006, 1008, 217) including pattern portions (test pattern portion 1 302, test pattern portion 2 1028, test pattern portion 3 1026, pattern portion 4 308), respectively, are folded up and placed around a camera holder. For example, during assembly panel 206 including test pattern portion 302 is rotated about axis 402; panel 1006 including test pattern portion 1028 rotated about axis 404, panel 1008 including test pattern portion 1026 is rotated about axis 406; and panel 217 including test pattern portion 308 is rotated about axis 408.

Figure 19:
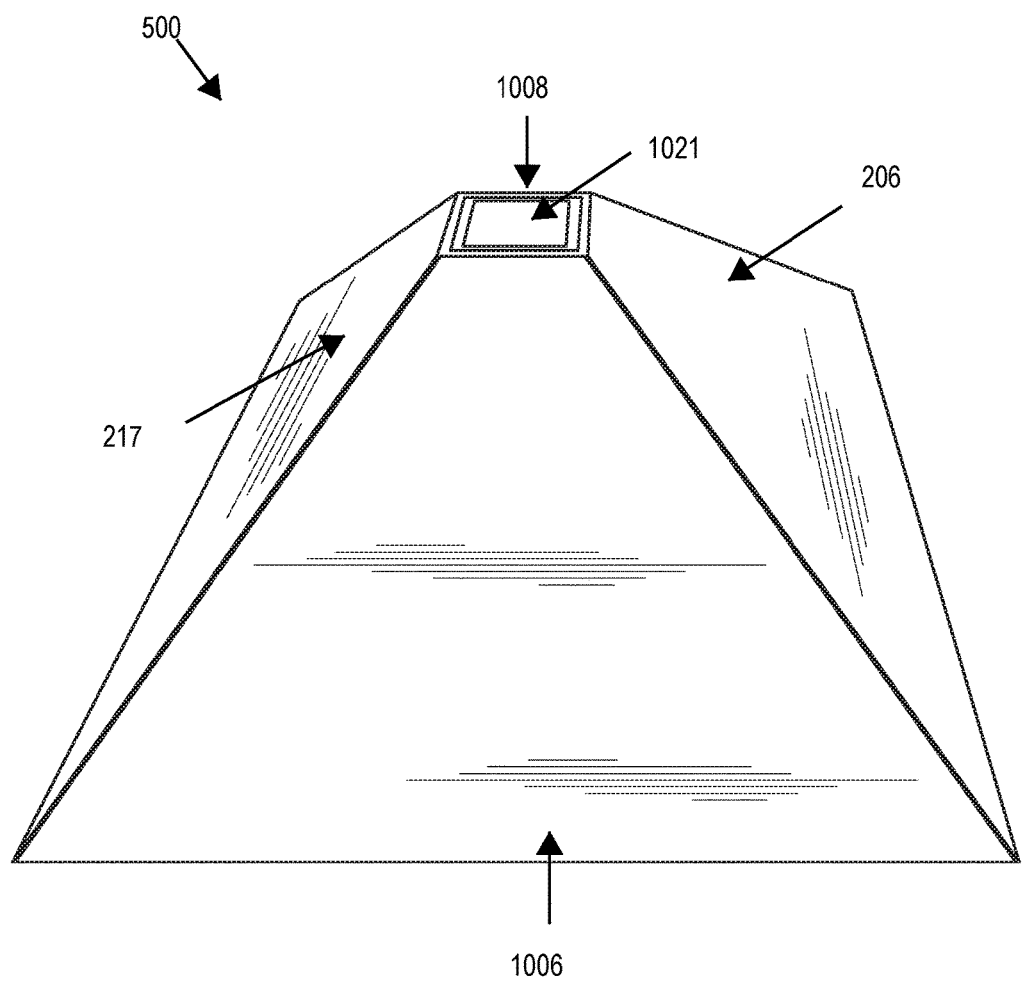
FIG. 19 is a drawing showing the four panels of FIG. 17 and FIG. 18 which have been assembled to form a sloped surface surrounding the opening from an outside perspective.

FIG. 19 is a drawing 500 showing panels (206, 1006, 1008, 217) which have been assembled to form a sloped surface surrounding opening 1021, from an outside perspective. The test pattern portions (302, 1028, 1026, 308), which are mounted on panels (206, 1006, 1008, 217), respectively, are not visible in FIG. 19 since the test pattern portions are on mounted on the inside of the enclosure. FIG. 17 shows the inside view of the enclosure, in which the test pattern portions are visible.

FIG. 20 is a drawing showing exemplary test pattern 1022, e.g., a second test pattern, in accordance with an exemplary embodiment. Exemplary test pattern 1022 is, e.g., the second test pattern which is mounted on the second side 214 of movable support structure 1023. Exemplary test pattern 1022 includes squares, e.g., in a checkerboard pattern, and further includes various markers or indicators within the test pattern, e.g., indicated by small "+" and "o" symbols, placed at predetermined locations, e.g., to be used for alignment purposes. It should be observed that the squares of the second test pattern 1022, which is mounted on the movable support 1023 are smaller in size than the squares of the first test pattern 300 of FIGS. 17 and 18. This is intentional because the light path distance from the second test pattern 1022 to the camera being calibrated is smaller than the light path distance between the first test pattern 300 and the camera being calibrated because of the use of one or more mirrors, e.g., movable mirror 1020, fixed mirror 1027.

Figure 21:
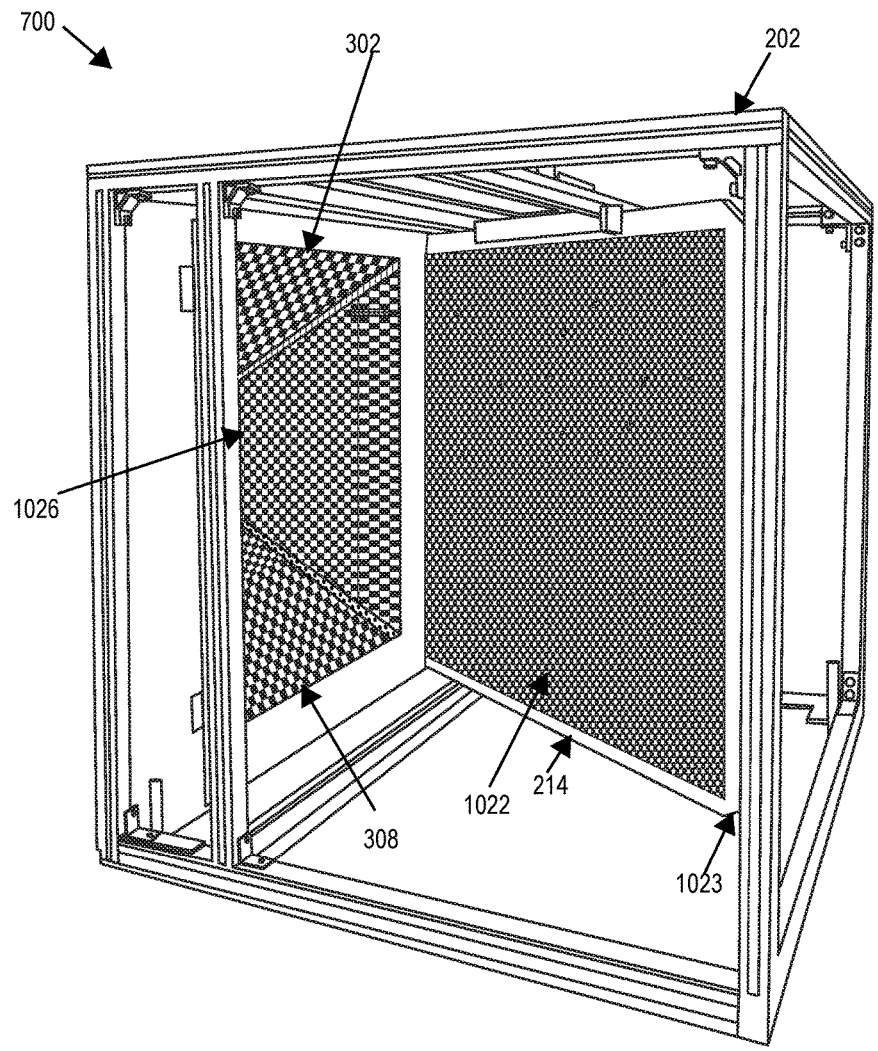
FIG. 21 is a drawing illustrating the exemplary camera calibration apparatus of FIG. 15 including a first test pattern and a second test pattern, in accordance with an exemplary embodiment.

FIG. 21 is a drawing 700 illustrating the exemplary camera calibration apparatus 200 which includes support structure 202, first test pattern 300 and second test pattern 1022, in accordance with an exemplary embodiment. In drawing 700, first test pattern portion 1 302, first test panel portion 3 1026, first test pattern portion 4 308, which are mounted on panels (206, 1008, 217), respectively, are visible. In addition second pattern 1022 which is mounted on a second side 214 of movable support structure 1023 is also visible.

Figure 22:
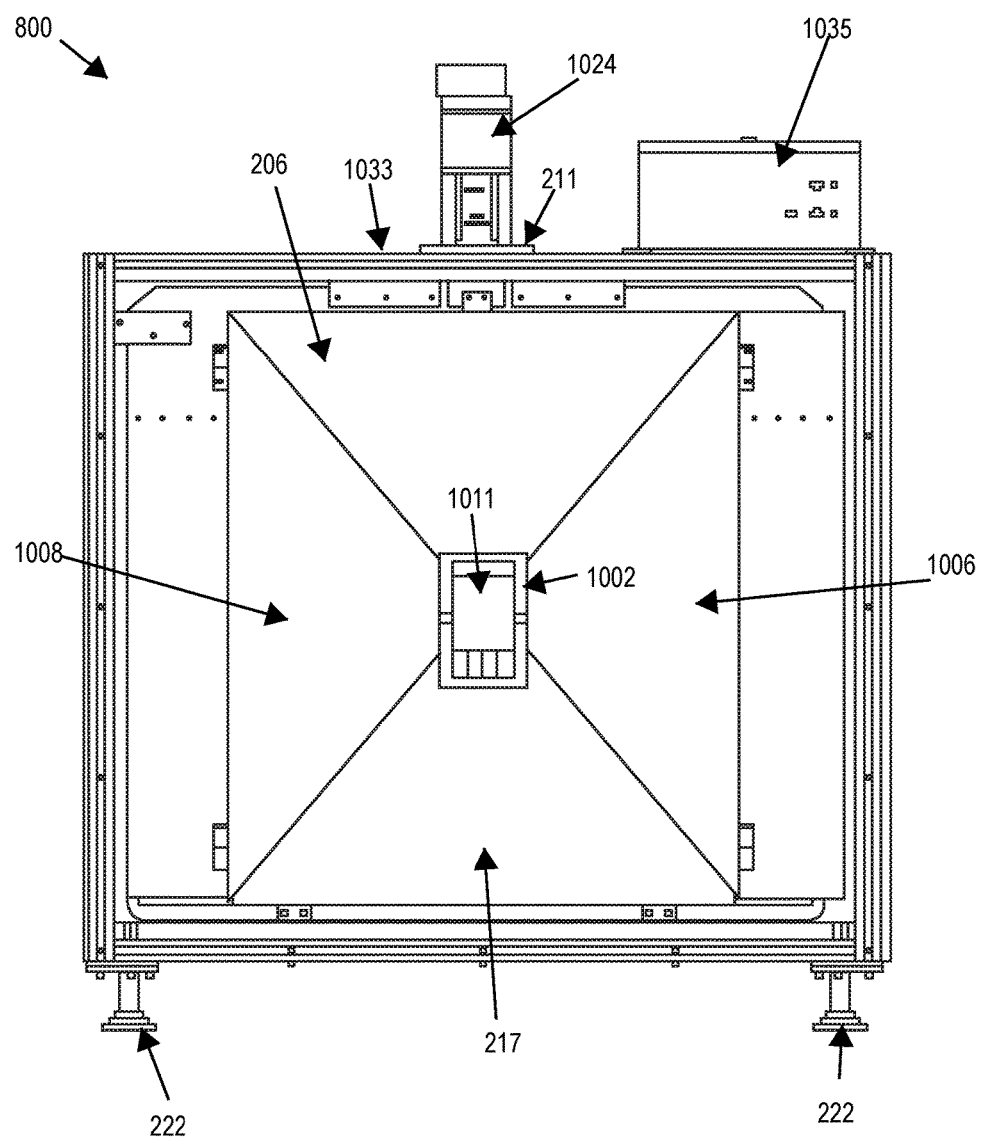
FIG. 22 is a drawing illustrating the exemplary camera apparatus of FIG. 15 illustrating that the motor and controller are mounted on the roof of the camera calibration apparatus.

FIG. 22 is a drawing 800 illustrating the exemplary camera calibration apparatus 200. In FIG. 22, the motor 1024 is shown mounted in roof 1033 of the camera apparatus housing via motor assembly mount 211; the controller 1035 is also shown mounted on the roof 1033 of the camera apparatus housing. In FIG. 22, the four panels (206, 1006, 1008, 217) are shown from the outside perspective. In addition, in FIG. 22, the camera holder 1002, an exemplary camera 1011 and camera calibration apparatus mounting feet 222 are also shown.

Figure 23:
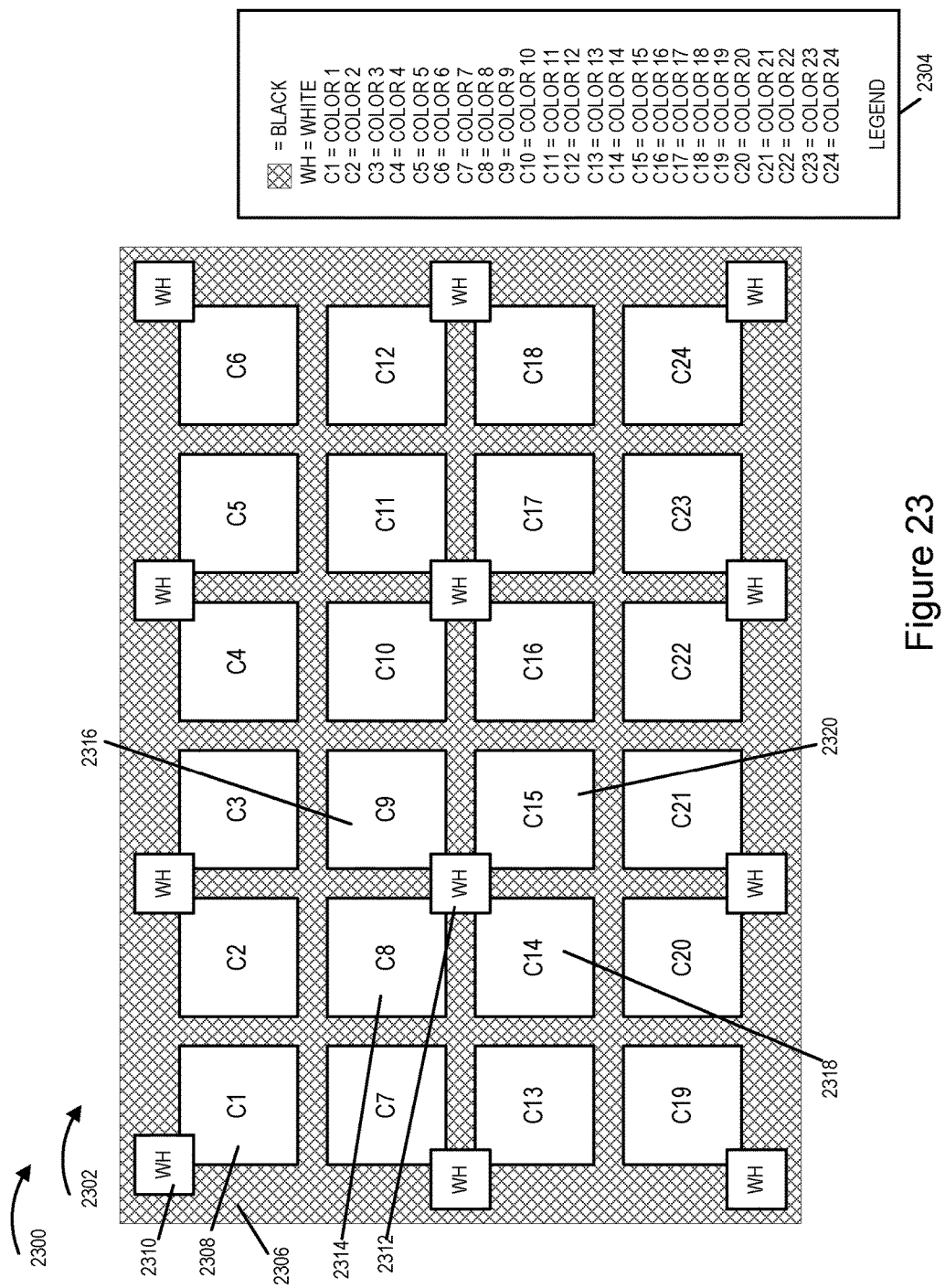
FIG. 23 is a drawing of an exemplary color calibration test pattern, e.g., color calibration chart, which is included in a camera calibration test apparatus in some embodiments.

FIG. 23 is a drawing 2300 of an exemplary color calibration test pattern 2302 and a corresponding legend 2304, in accordance with an exemplary embodiment. Exemplary color calibration test pattern 2302 is included, in some embodiments, in a camera calibration apparatus, e.g., camera calibration apparatus 1000 or 1200 or 200. Exemplary test pattern 2304 includes a black background 2306, a plurality of uniform color reference areas, e.g., white reference areas such as white square 2310, and a plurality of different color patches, e.g., color patch 2308 having color C1 and additional patches of other colors. Each of the color patches has an adjacent region to a white reference area. For example color patch 2408 with color C1 has an adjacent region to white reference patch 2310. In some embodiments, the reference areas, e.g., reference squares such as reference square 2310 are a predetermined shade of gray rather than white. The uniform color, e.g., white, reference areas allow for the use of a slightly non-uniform or non-uniform illumination source. The reference areas allow for the effect of non-uniform illumination to be detected and then taken into consideration when using measurements, e.g., captured pixel values, of the color patches adjacent the reference areas. The use of such a pattern by providing reference areas adjacent the color test pattern areas used for color calibration allow for less expensive light sources to be used than might otherwise be required for accurate color calibration. While the reference areas allow for the detection of non-uniform illumination and allow the non-uniformity to be corrected for when using measurements of the color patches for calibration purposes, the system can be used with highly uniform light sources if so desired.

Legend 2404 indicates that: crosshatch shading is used to indicate the black, WH is used to indicate white, C1 is used to indicate the color 1, C2 is used to indicate color 2, C3 is used to indicate the color 3, C4 is used to indicate color 4, C5 is used to indicate the color 5, C6 is used to indicate color 6, C7 is used to indicate the color 7, C8 is used to indicate color 8, C9 is used to indicate the color 9, C10 is used to indicate color 10, C11 is used to indicate the color 11, C12 is used to indicate color 12, C13 is used to indicate the color 13, C14 is used to indicate color 14, C15 is used to indicate the color 15, C16 is used to indicate color 16, C17 is used to indicate the color 17, C18 is used to indicate color 18, C19 is used to indicate the color 19, C20 is used to indicate color 20, C21 is used to indicate the color 21, C22 is used to indicate color 22, C23 is used to indicate the color 23, and C24 is used to indicate color 24.

In one example, C1=white, C2=light gray, C3=light-medium gray, C4=medium gray, C5=dark gray, C6=black, C7=dark blue, C8=medium green, C9=red, C10=yellow, C11=bright purple, C12=turquoise, C13=medium orange, C14=medium blue, C15=rose, C16=dark purple, C17=light green, C18=light orange, C19=brown, C20=tan, C21=light blue, C22=dark green, C23=light purple, C24=aqua green.

In various embodiments, the color calibration test pattern 2302, e.g., a color calibration chart, is installed in a camera calibration apparatus and illuminated by a light source or sources, which illuminates different portions of the calibration chart by different amounts and is thus referred to as a non-uniform light source since all areas are not illuminated in a uniform manner. The location of the color calibration test pattern 2302 may vary depending on the embodiment. In some embodiments the chart is mounted on a sidewall of the interior of the camera calibration apparatus or on one side of the movable support structure. In some embodiments, the color calibration chart 2302 is embedded within a portion of the second test pattern mounted on the movable support structure.

The color calibration chart 2302 is, e.g., illuminated by one or more strips of LEDs. Depending on the embodiment the LEDs maybe e.g., low cost imprecise illuminations devices, within the camera test apparatus. The placement of the one or more strips of lighting devices, e.g., strips of LEDs, with respect to the location of the color calibration chart, as well as output variations between different LEDs and pointing directions and coverage areas of the individual LEDs, results in different portions of the calibration chart being illuminated by different amounts. In other embodiments highly uniform and sometimes costly uniform light sources are used instead.

In various embodiments, a camera device mounted in the camera calibration apparatus captures an image including the non-uniformly illuminated color calibration chart 2302. The camera extracts reference information, e.g., luminance reference information, from portions of the captured image corresponding to reference areas, e.g., white reference areas such as reference block 2310. In some embodiments, the camera determines an average value luminance for each of the white reference blocks. In various embodiments, the camera device determines a correction factor or factors to be applied to each of the color patches in the captured image based on the determined luminance reference information. For example, the captured image portion corresponding to color patch C1 2308 is corrected, e.g., color corrected, by reference information derived from reference block 2310. Similarly, the captured image portion corresponding to color patches (C8 2314, C9 2316, C14 2318, C15 2320) is each corrected by reference information derived from reference block 2312. Thus a information derived from a white reference block, adjacent to a color path portion, is used to determine color correction information, e.g., one or more color correction parameters, for the color patch.

Figure 24:
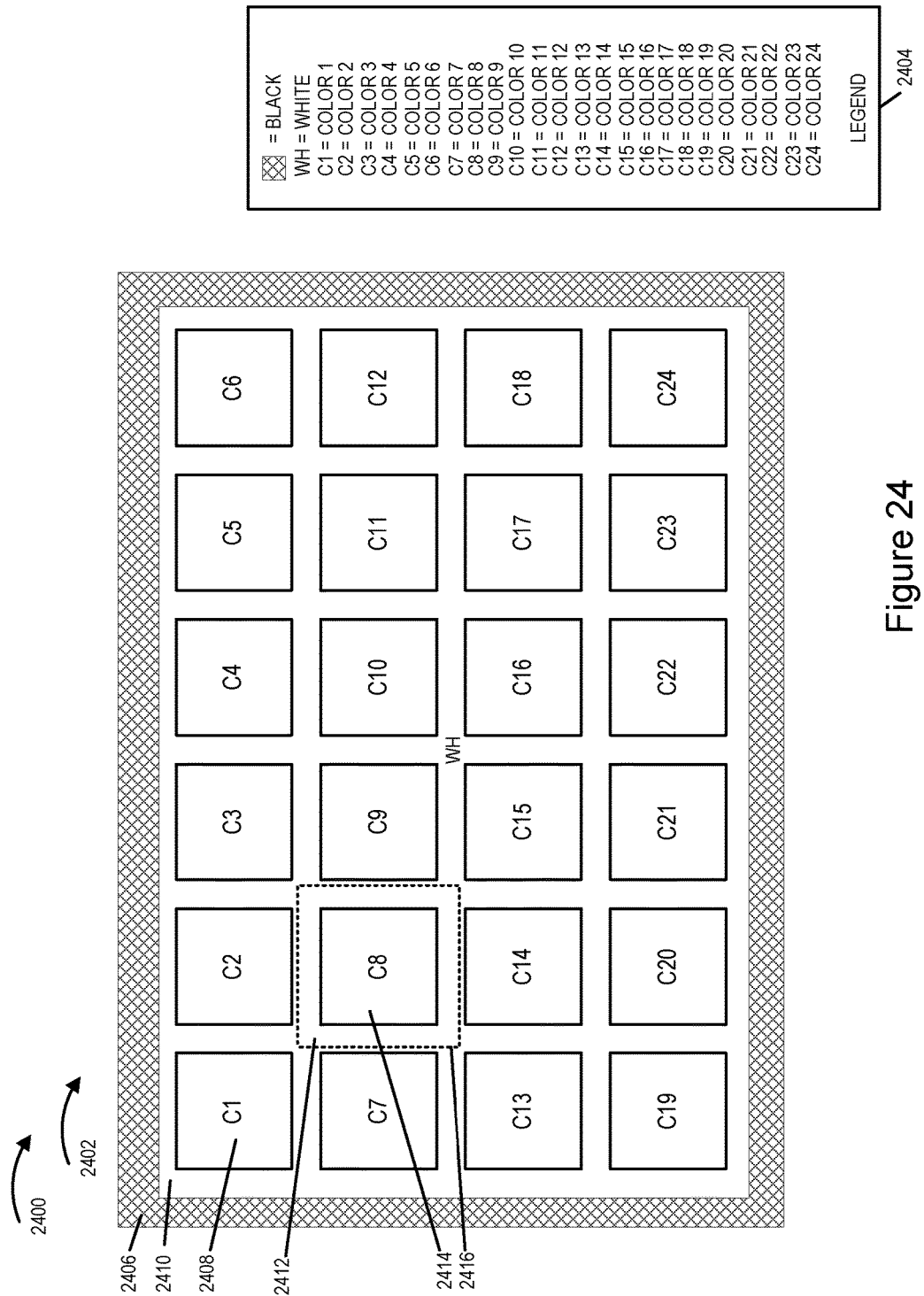
FIG. 24 is a drawing of another exemplary color calibration test pattern, e.g., color calibration chart, which is included in a camera calibration test apparatus in some embodiments.

FIG. 24 is a drawing 2400 of an exemplary color calibration test pattern 2402 and a corresponding legend 2404, in accordance with an exemplary embodiment. Exemplary color calibration test pattern 2402 is included, in some embodiments, in a camera calibration apparatus, e.g., camera calibration apparatus 1000 or 1200 or 200. Exemplary test pattern 2404 includes a black background 2406, white reference area 2408, and a plurality of different color patches, e.g., color patch 2410 having color C1. Each of the color patches has a surrounding adjacent region of white reference area. For example color patch 2414 with color C8 has an adjacent region of white reference area 2412, as indicated by dotted line 2414. Note that reference area 2412 is part of reference area 2410. In some embodiments, the reference area 2410 is a predetermined shade of gray rather than white.

Legend 2404 indicates that: crosshatch shading is used to indicate black, WH is used to indicate white, C1 is used to indicate the color 1, C2 is used to indicate color 2, C3 is used to indicate the color 3, C4 is used to indicate color 4, C5 is used to indicate the color 5, C6 is used to indicate color 6, C7 is used to indicate the color 7, C8 is used to indicate color 8, C9 is used to indicate the color 9, C10 is used to indicate color 10, C11 is used to indicate the color 11, C12 is used to indicate color 12, C13 is used to indicate the color 13, C14 is used to indicate color 14, C15 is used to indicate the color 15, C16 is used to indicate color 16, C17 is used to indicate the color 17, C18 is used to indicate color 18, C19 is used to indicate the color 19, C20 is used to indicate color 20, C21 is used to indicate the color 21, C22 is used to indicate color 22, C23 is used to indicate the color 23, and C24 is used to indicate color 24.

In one example, C19=white, C20=light gray, C21=light-medium gray, C22=medium gray, C23=dark gray, C24=black, C13=dark blue, C14=medium green, C15=red, C16=yellow, C17=bright purple, C18=turquoise, C7=medium orange, C8=medium blue, C9=rose, C10=dark purple, C11=light green, C12=light orange, C1=brown, C2=tan, C3=light blue, C4=dark green, C5=light purple, C6=aqua green.

In various embodiments, the color calibration test pattern 2402, e.g. a color calibration chart, is installed in a camera calibration apparatus and illuminated by a light source or sources, which illuminates different portions of the calibration chart by different amounts. For example, the color calibration test pattern 2402 is, e.g., mounted on a sidewall of the interior of the camera calibration apparatus or on one side of the movable support structure. In some embodiments, the color calibration chart 2402 is embedded within a portion of the second test pattern mounted, e.g., test pattern 1022 or 1222, on the movable support structure.

The color calibration chart 2402 is, e.g., illuminated by one or more strips of LEDs, e.g., low cost imprecise illuminations devices, within the camera test apparatus. The placement of the one or more strips of lighting devices, e.g., strips of LEDs, with respect to the location of the color calibration chart, as well as output variations between different LEDs and pointing directions and coverage areas of the individual LEDs, results in different portions of the calibration chart being illuminated by different amounts.

In various embodiments, a camera device mounted in the camera calibration apparatus captures an image including the non-uniformly illuminated color calibration chart 2402. The camera extracts reference information, e.g., luminance reference information, from portions of the captured image corresponding to reference areas, e.g., white reference areas such as reference area 2412 surrounding color path 2414 with color C8. In some embodiments, the camera determines an average value luminance for a reference area surrounding a color path area. In other embodiments, the camera device extrapolates luminance reference information corresponding to different locations within the color patch based on measured luminance information in the reference area surrounding the color patch. In various embodiments, the camera device determines a correction factor or factors to be applied to each of the color patches in the captured image based on the determined luminance reference information obtained from the surrounding area corresponding to a color patch. For example, the captured image portion corresponding to color patch C8 2414 is corrected, e.g., color corrected, by reference information derived from reference area 2412. Thus information derived from a white reference area adjacent to and surrounding a color patch portion, is used to determine color correction information, e.g., one or more color correction parameters, for the color patch.

Thus correction parameters are determined and used to compensate for non-uniform illumination of a color chart which is being used to perform color calibration of a camera, e.g., color calibration of an image sensor in an optical chain of a camera. The use of the reference areas, e.g., white or gray reference areas adjacent and/or surrounding color patches on the color chart facilitates color calibration of image sensors in optical chains of a camera device without the need for a high level of uniformity with regard to color chart illumination, e.g., different portion of the color chart may be, and sometimes are, illuminated by different amounts within the camera calibration apparatus.

Figure 25:
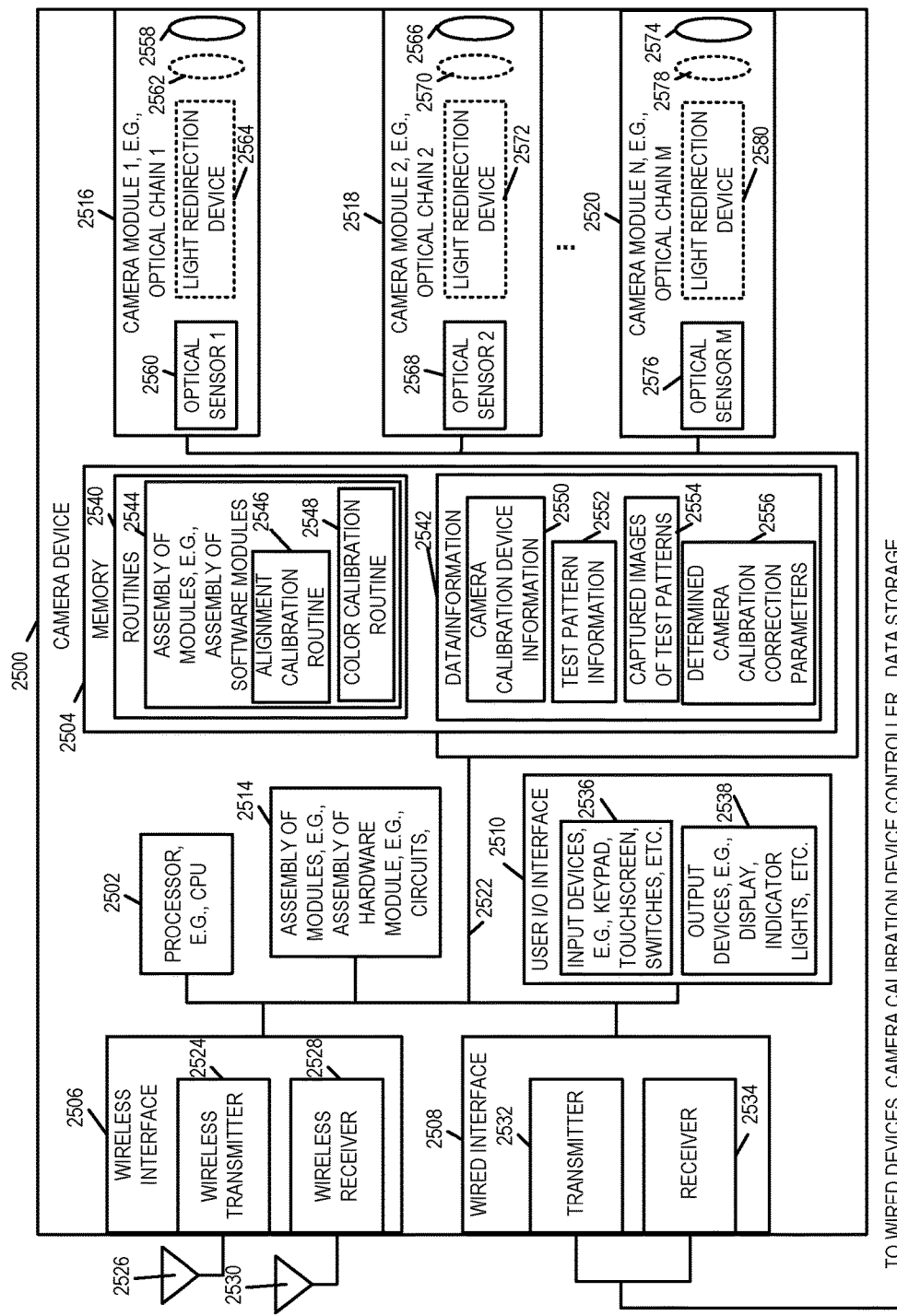
FIG. 25 is a drawing of an exemplary camera device in accordance with an exemplary embodiment.

FIG. 25 is a drawing of an exemplary camera device 2500 in accordance with an exemplary embodiment. Exemplary camera device 2500 is, e.g., camera device 1011 of FIGS. 1-6, camera device 1211 of FIGS. 7-11, camera device 1215 of FIGS. 7-11, a camera device implementing one or more steps of flowchart 1300 of FIG. 12, a camera device interfacing the camera test apparatus controller of FIG. 13, a camera device including one or more modules of assembly of modules 1500 of FIG. 14, a camera device mounted in camera test apparatus 200 of FIGS. 15-16, 21-22, and/or a camera device implementing a color calibration method described with respect to FIGS. 23-24.

Camera device 2500 includes a processor 2502, e.g., a CPU, memory 2504, a wireless interface 2506, a wired interface 2508, a user I/O interface 2510, and a plurality of camera modules, e.g., optical chains (camera module 1 2516, e.g. optical chain 1, camera module 2 2518, e.g., optical chain 2, . . . , camera module M 2520, e.g., optical chain M 2520), coupled together via bus 2522 over which the various elements may interchange data and information. Memory 2504 includes routines 2540 and data/information 2542.

Routines 2540 include assembly of modules 2544, e.g., an assembly of software modules. Assembly of modules 2544 includes an alignment calibration routine 2546 and a color calibration routine 2548. In some embodiments, alignment calibration routine 2546 performs one or more steps of flowchart 1300 of FIG. 12 or one or more actions in response to a step of flowchart 1300 of FIG. 12, e.g., capturing an image of a test pattern in response to control signal from a controller in a test apparatus. In various embodiments, alignment calibration routine 2546 controls one or more camera modules (2516, 2518, . . . , 2520), e.g., optical chains, in the camera 2500 to capture an image of one or more test patterns, e.g., a first test pattern and a second test pattern. In some embodiments, alignment calibration routine 2546 performs determinations of alignment calibration parameters based on captured images of test patterns. In some embodiments, alignment calibration routines communicates captured images of test patterns to another device, e.g., a controller in a camera test apparatus, for processing and determination of alignment calibration parameters. In various embodiments, alignment calibration routine 2548 stores determined and/or received alignment calibration parameters for the camera device in memory 2504, e.g., for subsequent use for an operator of the camera device. Color calibration routine 2548 performs various steps described with respect to FIGS. 23 and 24 to capture images and/or determine color calibration parameters for the camera 2500 based on captured images of a color chart which are captured by the camera device 2500 in a non-uniform illumination environment. In various embodiments, color calibration routine 2548 controls one or more camera modules (2516, 2518, . . . , 2520), e.g., optical chains, in the camera 2500 to capture an image of one or more color test patterns, e.g., color test pattern 2302 of FIG. 23 and/or color test pattern 2402 of FIG. 24.

Data/information 2542 includes camera calibration device information 2520, test pattern information 2552, captured images of test patterns 2554, and determined camera calibration correction parameters 2556, e.g., optical chain alignment information with respect to the camera mounting, alignment information between different optical chains of the camera, optical sensor calibration parameters, color calibration parameters, etc.

Wireless interface 2506 includes a wireless transmitter 2524 coupled to transmit antenna 2526 via which the camera device may transmit wireless signals, e.g., wireless signals communicating camera type information, camera S/N information, a signal to initiate a camera calibration apparatus test sequence, a captured image including a test pattern, a calibration parameter, etc., to: a camera calibration apparatus including a controller, a storage device, and/or a processing device. Wireless interface 2506 further includes a wireless receiver 2528 coupled to a receive antenna 2530 via which the camera device 2500 may receive wireless signals, e.g., information indicating the type and/or S/N of a camera calibration apparatus, a control signal from a controller in a camera calibration apparatus instructing the camera 2500 to capture one or more images or a test pattern, one or more determined camera calibration parameters, etc.

Wired interface 2508 includes transmitter 2524 and receive 2534, via which the camera device may transmit and receive signals, respectively, to various devices including a camera calibration device including a controller, a data storage device, a data processing device, and/or to the Internet. Wired transmitter 2532 may send signals communicating, e.g., camera type information, camera S/N information, a signal to initiate a camera calibration apparatus test sequence, a captured image including a test pattern, a calibration parameter, etc. Wired interface 2508 may receive signals communicating, e.g., information indicating the type and/or S/N of a camera calibration apparatus, a control signal from a controller in a camera calibration apparatus instructing the camera device 2500 to capture one or more images of a test pattern, one or more determined camera calibration parameters, etc.

User I/O interface 2510 includes input devices 2536 and output devices 2538. The input devices 2538 include, e.g., a keypad, a touch screen, switches, buttons, etc. Exemplary user input received by an input device 2536 includes, e.g., a selection to set the camera device in a calibration test mode of operation, a command to start a calibration process, a command to clear stored calibration parameters, a command to update calibration parameters, a command to store calibration parameters. In some embodiments, the camera device 2500 includes multiple alternative calibration modes of operation including a first calibration mode of operation in which the camera device is installed in a calibration test apparatus, e.g., a factory calibration test mode, an a second calibration mode of operation in which the camera device can be calibrated in the field without the use of the calibration test apparatus, e.g., the camera captures one or more images of a test pattern poster mounted on a wall.

Each of the camera modules, e.g., optical chains (camera module 1 2516, e.g., optical chain 1, camera module 2 2518, e.g., optical chain 2, . . . , camera module M 2520, e.g., optical chain M) includes at least one lens (2558, 2566, 2574) and an optical sensor (2560, 2568, . . . , 2576), respectively. In some embodiments, some of the optical chains (2516, 2518, . . . , 2520) further includes one or more additional lenses, e.g., (lens 2562, 2570, . . . , 2578), respectively. In some embodiments, some of the optical chains (2516, 2518, . . . , 2520) further include a light redirection device, e.g., a mirror or prism, (2564, 2572, . . . , 2580), respectively. In some embodiments, some of the optical chains (2516, 2518, . . . , 2520) further include a movable controllable lens barrel, e.g., for supporting zoom operations. In one exemplary embodiment, camera 1011 is camera 2500 of FIG. 25, and camera modules (1080, 1082, 1084) of FIG. 2 are camera modules (2516, 2518, . . . , 2520) of FIG. 25. In one exemplary embodiment, camera 1211 of FIG. 8 is a camera implemented in accordance with camera 2500 of FIG. 25, and camera modules (1280, 1282, 1284) of FIG. 2 are camera modules (2516, 2518, . . . , 2520) of FIG. 25. In one exemplary embodiment, camera 1215 of FIG. 8 is a camera implemented in accordance with camera 2500 of FIG. 25, and camera modules (1280, 1282, 1284) of FIG. 8 are camera modules (2516, 2518, . . . , 2520) of FIG. 25.

Numerous additional variations and combinations are possible while remaining within the scope of the invention.

The techniques of the present invention may be implemented using software, hardware and/or a combination of software and hardware. The present invention is directed to apparatus, e.g., a camera calibration apparatus which may be used to calibrate camera devices including one or more cameras or camera modules. It is also directed to methods, e.g., method of controlling a camera test apparatus, e.g. camera calibration apparatus, in accordance with the present invention. The present invention is also directed to apparatus, e.g., various camera devices, e.g., cameras, cell phones, and/or other devices which include one or more cameras or camera modules, which may be installed in a camera calibration apparatus. It is also directed to methods, e.g., method of controlling a camera device in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control the positioning of a movable support structure, control image capture by one or more camera being calibrated, control lighting illumination directed toward test patterns, determining calibration parameters based on captured images, transmitting captured images, transmitting calibration data, etc. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera calibration device, a controller in a camera calibration device, a camera device, or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of calibrating cameras, at least some of the methods and apparatus of the present invention, are applicable to calibrating a wide range of image captures devices including tablet and cell phone devices which support or provide image capture functionality.

Captured images, e.g., captured images of test patterns, processed images and/or composite images, and/or data corresponding to captured images, e.g., including determined camera calibration constants, may be, and sometimes are displayed on the camera device, sent to a printer for printing, sent to a data processing device, and/or sent to a data storage device, e.g., to be kept as a permanent document which can be maintained in a file as part of a record associated with the camera device and/or camera calibration device.

Numerous additional variations on the methods and apparatus of the present invention described above will be apparent to those skilled in the art in view of the above description of the invention. Such variations are to be considered within the scope of the invention. In various embodiments the camera devices, which may be calibrated by the camera calibration device in accordance with the present invention, are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage, display, and/or subsequent processing.

Numerous additional variations and combinations are possible while remaining within the scope of the invention.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A camera calibration apparatus, comprising:
    a housing;
    a first camera holder including a view opening through which an interior portion of the housing is visible or viewing window through which the interior portion of the housing is visible;
    a first test pattern including a first test pattern portion, said first test pattern portion being positioned along a first sidewall portion of the housing, said first sidewall portion extending at an angle away from said first camera holder and to the left or right of said first camera holder;
    a first mirror for reflecting an image of the first test pattern to a camera in said first camera holder when said first mirror is in a first position physically in front of and physically facing both i) said first camera holder and ii) said first test pattern;
    a moveable support structure, said first mirror being mounted on a first side of said moveable support structure;
    a second test pattern mounted on a second side of said moveable support structure;
    a motor attached to said movable support structure for driving said moveable support structure between different positions, said different positions including a first position in which said first mirror faces said first test pattern and said first camera holder and a second position in which said second test pattern faces said first camera holder; and
    a second mirror mounted on a first sidewall of the housing in which said moveable support structure is positioned;
    wherein said motor is also for driving said movable support structure to a third position in which said first test pattern is reflected in said first and second mirrors making the reflection visible to a camera in said first camera holder;
    wherein said motor is mounted in a roof of said housing; and
    wherein said moveable support structure is mounted on a shaft of said motor, said moveable support structure rotating in response to rotation of said shaft of said motor.

2. The camera calibration apparatus of claim 1,
    wherein said first test pattern includes four sloped test pattern panels that form said first test pattern, said first test pattern portion being a first test panel which is one of said four sloped test pattern panels, said first test pattern surrounding said first camera holder;
    wherein said first camera holder is located on a first side of said housing and
    wherein said first test pattern is included on the first side of said housing on which said first camera holder is located.

3. The camera calibration apparatus of claim 1,
    wherein said first camera holder is located on a first side of said housing;
    wherein said first test pattern includes multiple first test pattern portions, said first test pattern being located on the first side of said housing; and
    wherein each of the multiple first test pattern portions are mounted on different panels, said different panels being angled to form a sloped surface surrounding the view opening or viewing window.

4. The camera calibration apparatus of claim 1,
    wherein said first test pattern portion is part of a first test pattern;
    wherein said first test pattern includes four first test pattern portions, each one of the four first test pattern portions being mounted on one of four different panels, said four panels being angled to form a sloped surface surrounding an opening corresponding the position of said first camera holder; and
    wherein said first mirror is positioned inside said housing at a location between said first sidewall and a second sidewall of said housing.

5. The camera calibration apparatus of claim 2, wherein the first test pattern positioned along a first sidewall portion of the housing is positioned to the right or left of said view opening or viewing window.

6. The camera calibration apparatus of claim 2,
    wherein each individual one of multiple first test pattern portions of said first test pattern includes an identifying mark which distinguishes the individual one of the multiple first test panel portions from the other ones of the multiple first test panel portions; and
    wherein said first test pattern also includes at least one orientation indicator which can be used to distinguish a top of the individual test pattern portion from a bottom of the individual test pattern portion.

7. The camera calibration apparatus of claim 1,
    wherein said camera calibration apparatus includes a non-uniform illumination source for illuminating said first test pattern; and
    wherein said first test pattern includes a plurality of different color patches, a uniform color reference area being positioned adjacent individual color patches to serve as illumination reference areas.

8. The camera calibration apparatus of claim 1, further comprising:
    a second camera holder located opposite said first camera holder, said moveable support structure being positioned between said first and second camera holders; and
    a third test pattern surrounding said second camera holder.

9. The camera calibration apparatus of claim 1, further comprising:
    rows of lights positioned in front of and on the left and right sides of said first test pattern.

10. The camera calibration apparatus of claim 9, further comprising at least one row of lights positioned below and in front of said first test pattern or above and in front of said first test pattern for illuminating said second test pattern when the second test pattern is facing said first camera holder.

11. The camera calibration apparatus of claim 10, further comprising one or more rows of lights to the side, bottom or top of said moveable support for illuminating said first test pattern when said first mirror is facing said first test pattern.

12. The camera calibration apparatus of claim 2, further comprising:
    a moveable support position and camera controller for controlling the position of said moveable support structure to switch between different predetermined positions and for controlling the camera mounted in said first camera holder to operate camera modules included in said camera to capture images when said moveable support structure is at multiple different ones of said predetermined positions.

13. The camera calibration apparatus of claim 1, wherein said first camera holder is outside said interior portion of the housing.

14. The camera calibration apparatus of claim 13,
    wherein said first camera holder is mounted on the outside of said housing and includes a space for holding a portable camera to be calibrated.

* * * * *